(12) United States Patent
Okada

(10) Patent No.: US 8,711,371 B2
(45) Date of Patent: Apr. 29, 2014

(54) IMAGE FORMING APPARATUS, CONTROL METHOD, AND STORAGE MEDIUM

(75) Inventor: Hideyuki Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/874,066

(22) Filed: Sep. 1, 2010

(65) Prior Publication Data

US 2011/0051162 A1 Mar. 3, 2011

(30) Foreign Application Priority Data

Sep. 3, 2009 (JP) .................................. 2009-203709

(51) Int. Cl.
*G06K 15/00* (2006.01)

(52) U.S. Cl.
USPC ........ 358/1.12; 358/1.13; 358/1.16; 358/1.15

(58) Field of Classification Search
USPC .......................................... 358/1.1–1.9, 521
IPC ...................................................... G06K 15/00
See application file for complete search history.

(56) References Cited

U.S. PATENT DOCUMENTS

| | | | |
|---|---|---|---|
| 5,768,485 A | 6/1998 | Shimizu | |
| 2002/0085222 A1* | 7/2002 | Shimizu et al. | ............. 358/1.12 |
| 2007/0057426 A1* | 3/2007 | Tao et al. | .................. 270/58.09 |

FOREIGN PATENT DOCUMENTS

| | | |
|---|---|---|
| JP | 5-155071 | 6/1993 |
| JP | 2005-186550 A | 7/2005 |
| JP | 2007-076125 A | 3/2007 |
| JP | 2007-168922 A | 7/2007 |

* cited by examiner

*Primary Examiner* — King Poon
*Assistant Examiner* — Ibrahim Siddo
(74) *Attorney, Agent, or Firm* — Canon USA Inc. IP Division

(57) ABSTRACT

An image forming apparatus including a function of executing printing on a preprint sheet acquires orientation information about an orientation setting method of the preprint sheet when receiving a print job. The image forming apparatus includes a control unit, and when processing according to a setting included in the print job cannot be executed unless the orientation setting method of the preprint sheet is changed even if image data included in the print job is rotated, according to the orientation information and the setting included in the print job, the control unit causes a display unit to display an orientation setting method with which the processing according to the setting included in the print job can be executed on the preprint sheet.

6 Claims, 23 Drawing Sheets

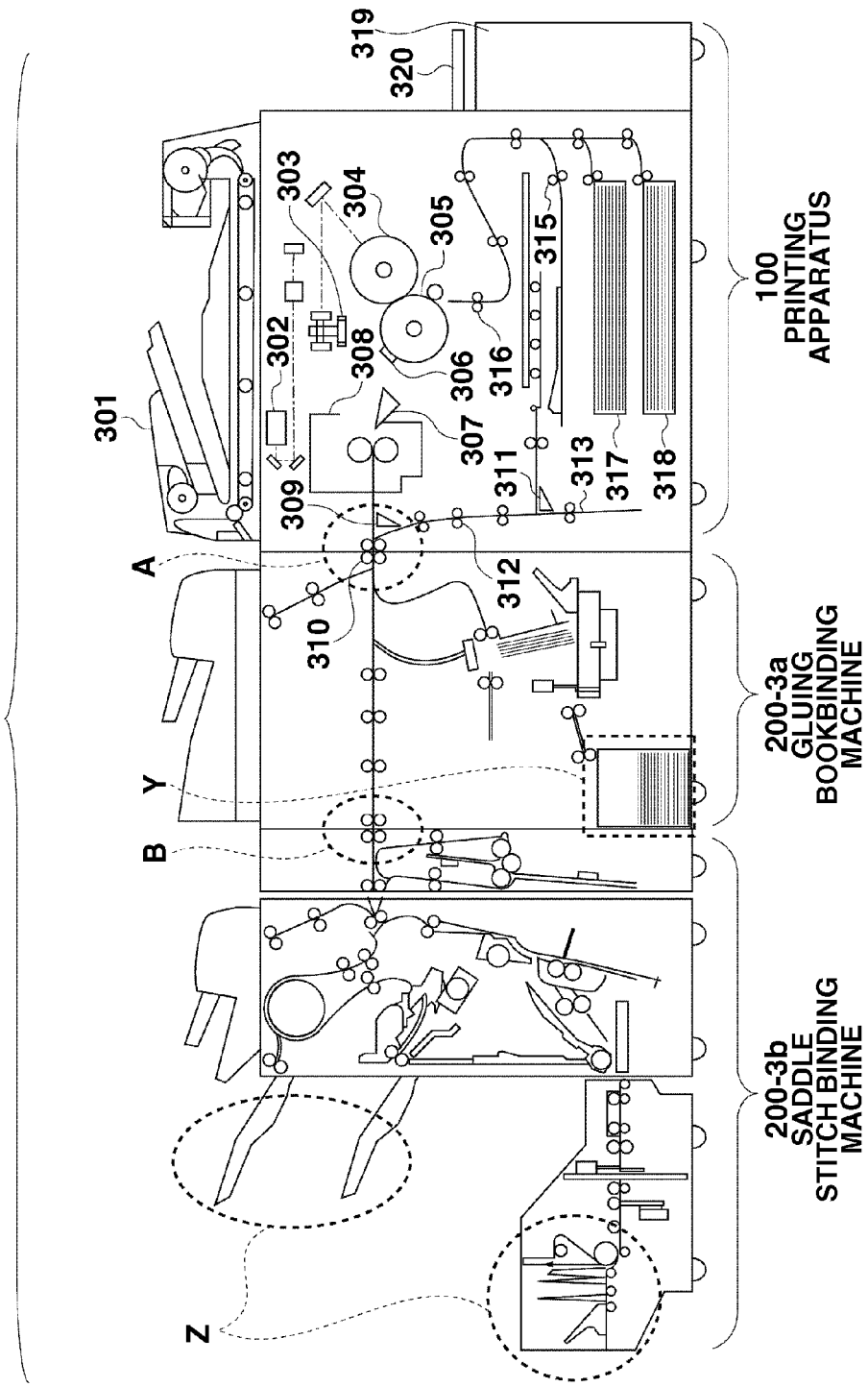

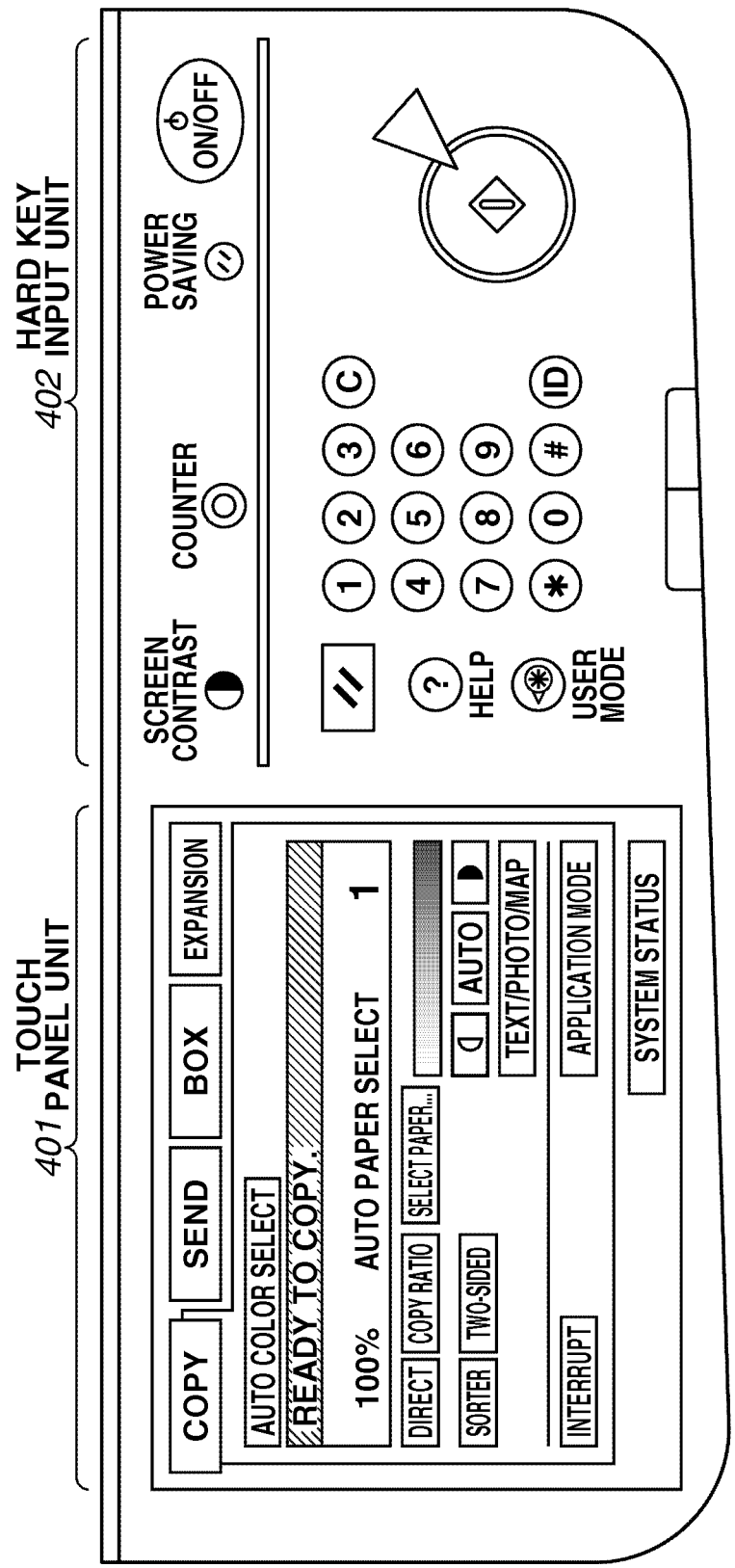

FIG.9
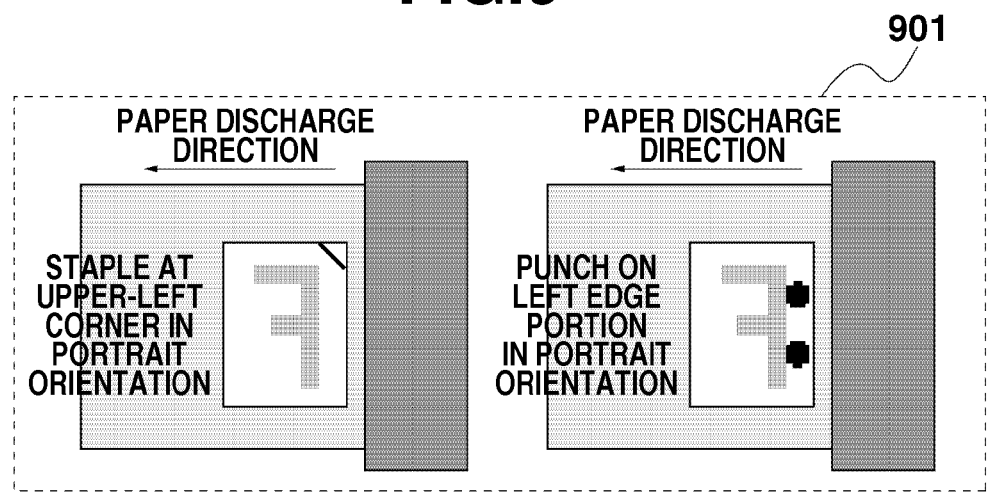
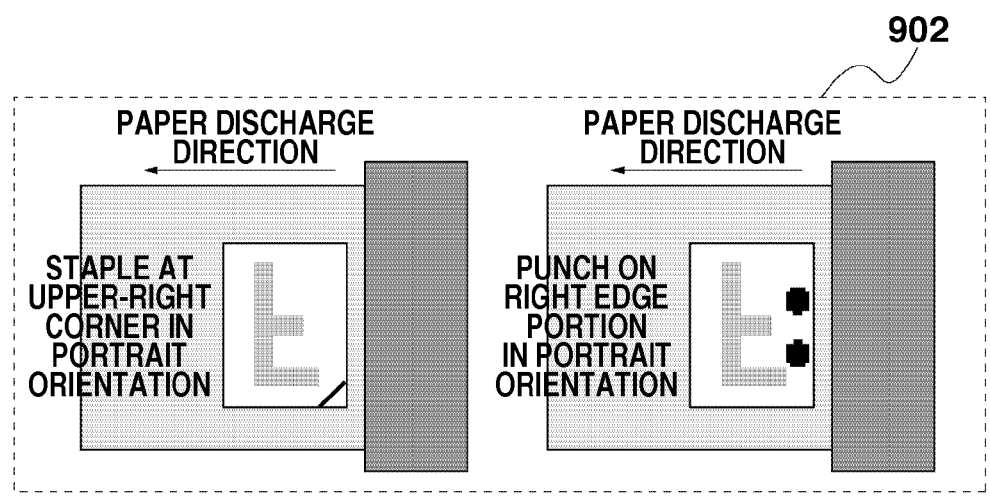

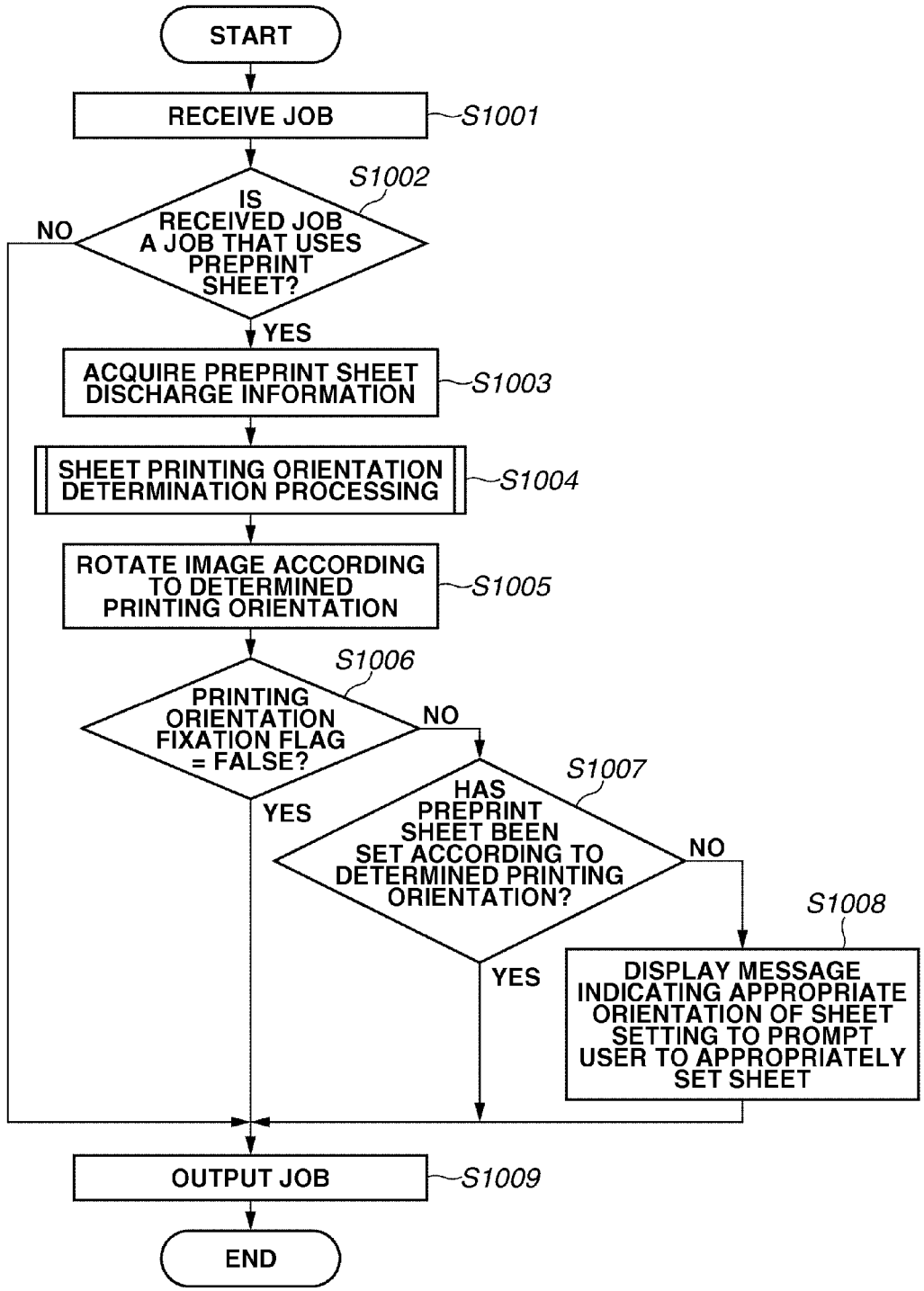

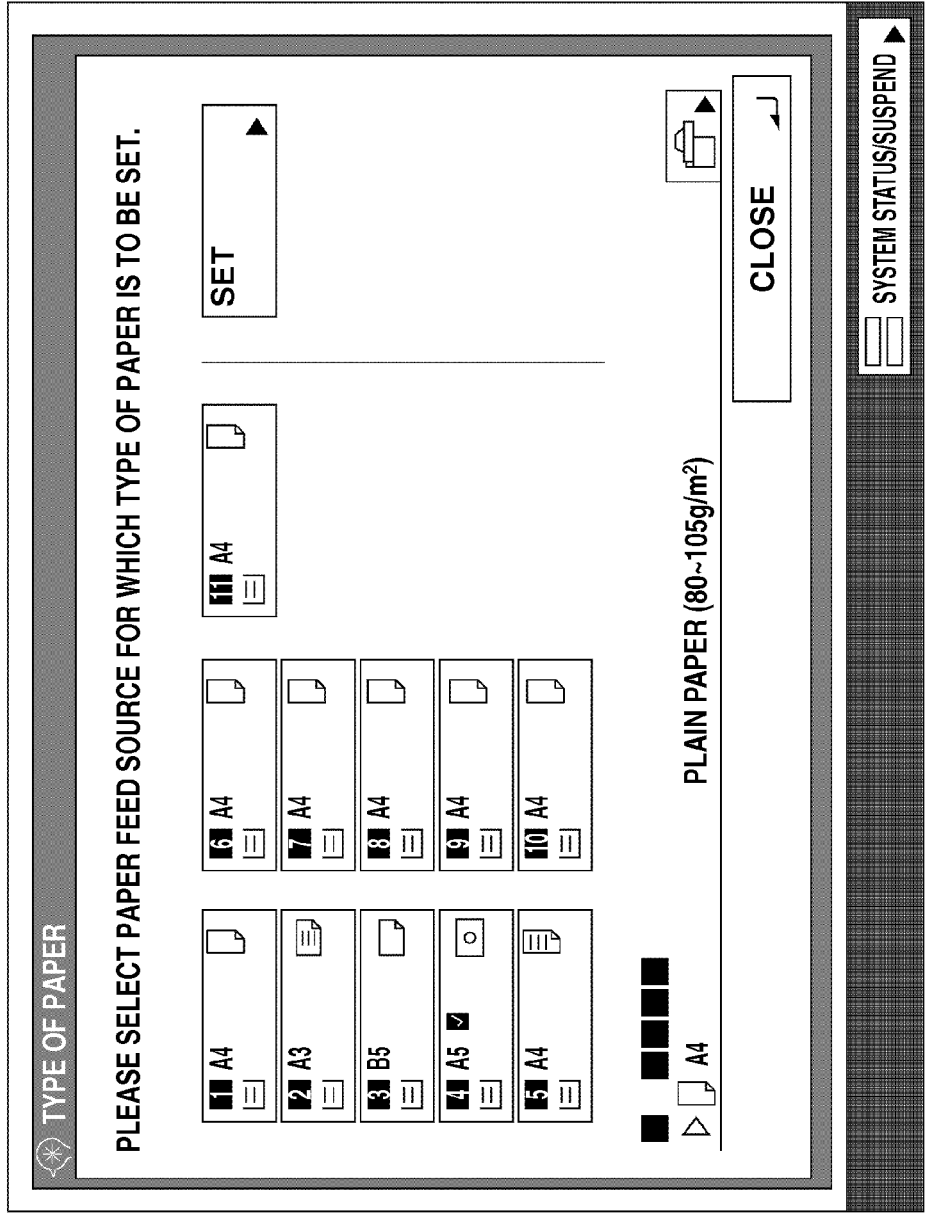

FIG.12C

PAPER TYPE SELECTION SCREEN

REGISTER PAPER: SELECT SHEET TYPE

ALL TYPES ▶

| NAME | GRAMMAGE |
|---|---|
| ONE-SIDED PREPRINT SHEET | 8mm/m |
| TWO-SIDED PREPRINT SHEET (SHORT-EDGE BINDING) | 166mm/m |
| TWO-SIDED PREPRINT SHEET (LONG-EDGE BINDING) | 166mm/m |
| INDEX SHEET (1051~1■■■) | 166mm/m |
| INDEX SHEET (1051~25■■) | 195mm/m |
| ONE-SIDED COATED PAPER (1051~115■■) | 48mm/m |
| ONE-SIDED COATED PAPER (1051~12■■) | 112mm/m |

2/6

GO TO SIMPLE SETTING | DETAILED INFORMATION

CANCEL | BACK | OK

SYSTEM STATUS/SUSPEND

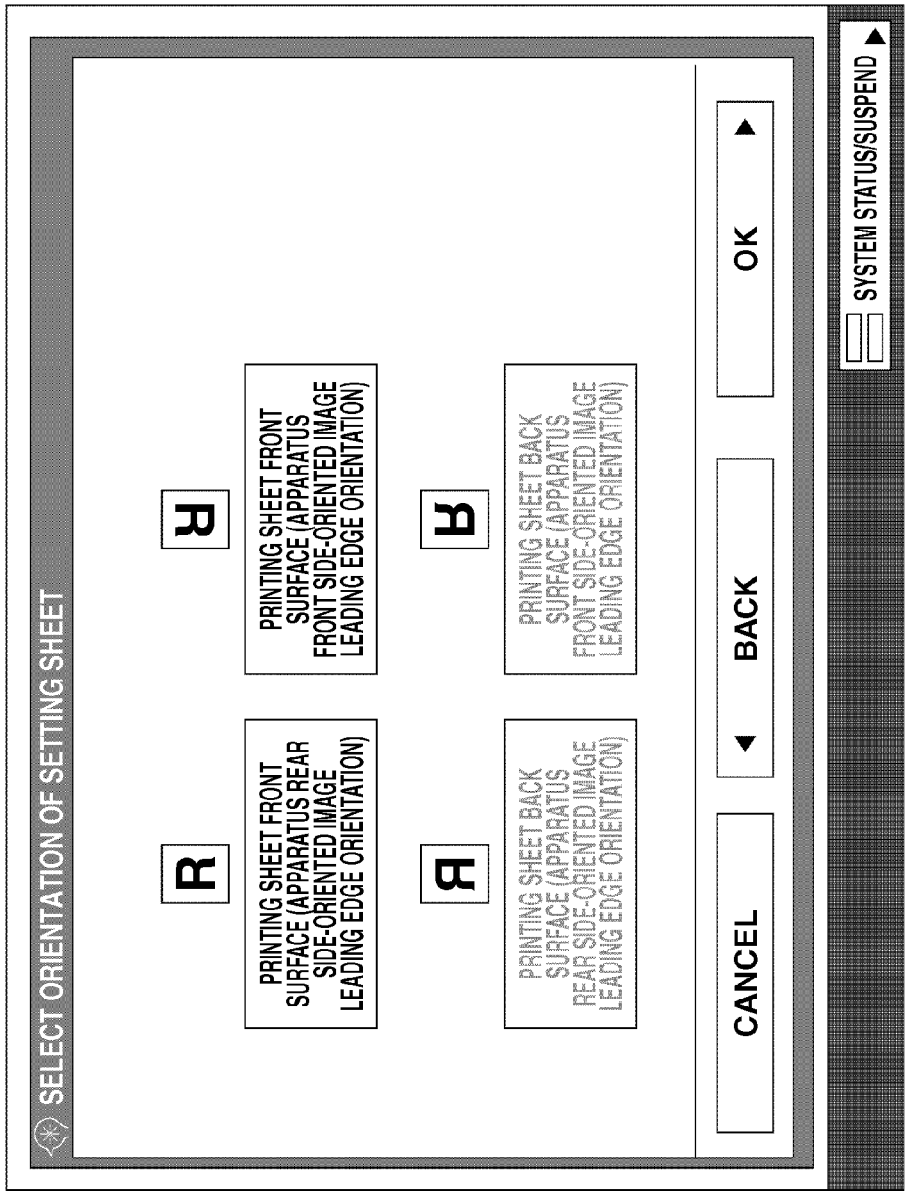

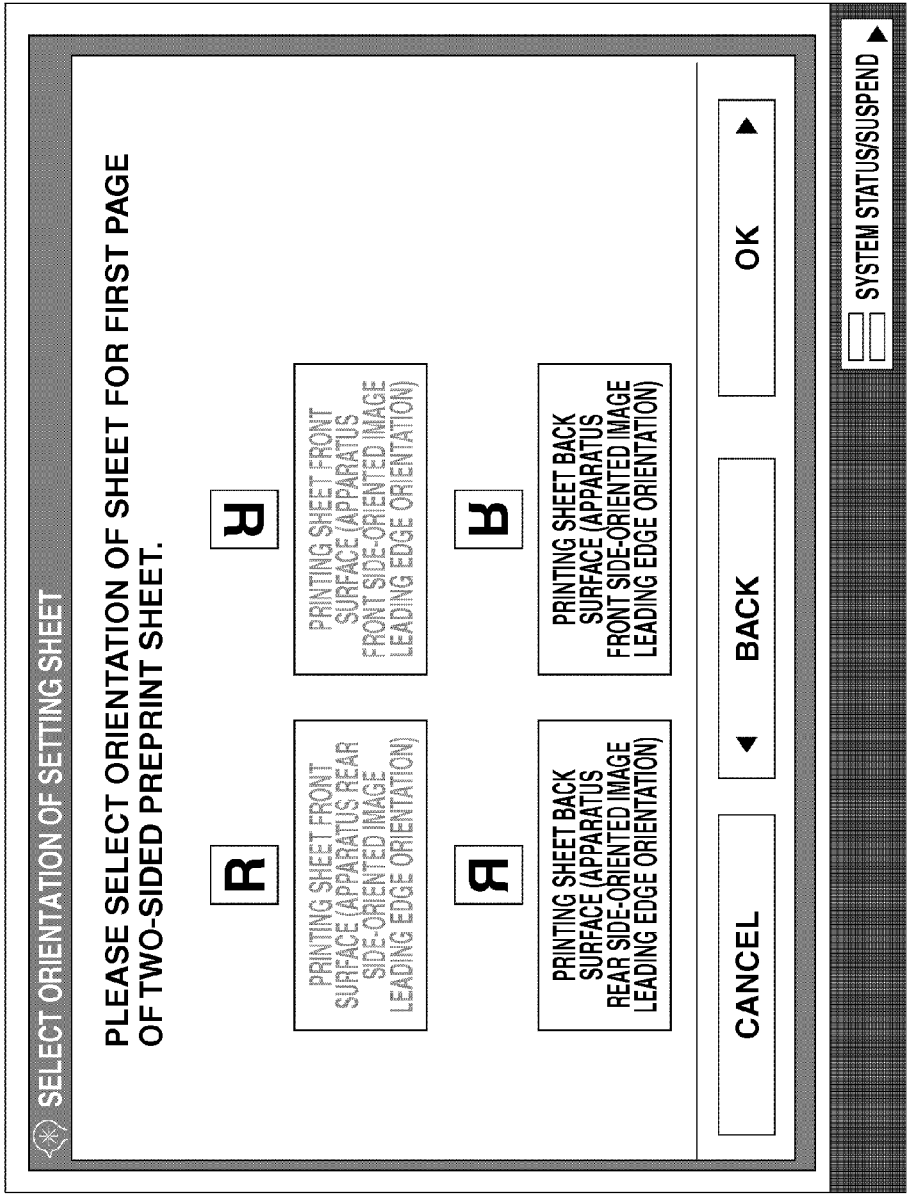

IMAGE FORMING APPARATUS, CONTROL METHOD, AND STORAGE MEDIUM

BACKGROUND OF THE INVENTION

1. Field of the Invention

The present invention relates to an image forming apparatus configured to execute printing using a preprint sheet, a method for controlling the image forming apparatus, and a storage medium.

2. Description of the Related Art

To compete with the conventional printing market, a print on demand (POD) printing system has been recently discussed, which utilizes an electrophotographic image forming apparatus or an inkjet type image forming apparatus. By using the POD printing system like this, it becomes unnecessary to prepare a block copy or to execute complicated operations.

However, in order to commercialize the POD printing system described above, the following problems remain unsolved. More specifically, a problem may arise in executing printing with using a preprint sheet on which a content has been already printed.

Nowadays, there are many use cases which uses variable printing in the POD printing. "Variable printing" is a printing method in which variable data is used for only a part of print products that have been mass-printed by offset printing process. More specifically, in this case, form templates that have been mass-printed are further subjected to variable printing by appropriately changing a content or a destination according to an attribute of a recipient or address of the destination.

In executing printing using a preprint sheet, it is necessary to consider an orientation of a content printed on the preprint sheet as well as considering an orientation of a printing sheet (i.e., a portrait or a landscape orientation). The orientation of a printed content indicates which surface (front or back) of a sheet on which the content is printed (a printing surface) and in which orientation a leading edge of an image of the content is oriented.

Unless the printing surface and the content image leading edge are appropriately recognized or set, the content may be printed in a wrong orientation on a resulting print product. In this case, the resulting print product may be useless. Further, in this case, a preprint sheet which is more valuable than plain paper, may be wastefully consumed. This problem of wastefully consuming a preprint sheet may increase printing costs and may not be left unsolved.

However, different image forming apparatuses may feed and convey a sheet from a paper feed cassette in different manners and may print an image on the sheet set in different orientations. Therefore, it is difficult for an operator of an image forming apparatus to recognize how each image forming apparatus operates in detail in printing.

In addition, in recent years, an image forming apparatus has become multifunctional and a level of operational precision thereof has improved. Therefore, a recent image forming apparatus has a complex mechanism. Accordingly, it has become all the more difficult for an operator to recognize how an image forming apparatus operates in printing.

As described above, in printing using a preprint sheet, a problem may arise such that it is not easy for an operator of an image forming apparatus to recognize an appropriate orientation of setting the preprint sheet in a paper feed cassette. Japanese Patent Application Laid-Open No. 05-155071 discusses a printing method in which an operator is allowed to set information about an orientation of a sheet and an image forming apparatus rotates an orientation of printing image data so that an appropriate print product is produced according to the information set by the operator. According to the method discussed in Japanese Patent Application Laid-Open No. 05-155071, it may become unnecessary for the operator to make efforts to appropriately set the preprint sheet, and it may be useful in improving the efficiency of an operation executed by an operator or usability of the image forming apparatus.

However, the method discussed in Japanese Patent Application Laid-Open No. 05-155071 may not be useful in the following case. More specifically, there is a case in which the orientation of printing is uniquely defined due to characteristics of a post-processing apparatus which is connected to downstream of an image forming apparatus. In this case, the operator may need to correct the orientation of the preprint sheet set in a paper feed cassette to an appropriate orientation. However, as described above, it is difficult for the operator to recognize the appropriate orientation of setting a preprint sheet. Accordingly, in order to avoid setting the preprint sheet in a wrong orientation or making mistake, it may become necessary for the operator to execute test printing.

SUMMARY OF THE INVENTION

According to an aspect of the present invention, an image forming apparatus including a function of executing printing on a preprint sheet includes a reception unit configured to receive a print job, an acquisition unit configured, if the print job received by the reception unit is a print job in which printing is executed on the preprint sheet, to acquire orientation information which is information about an orientation setting method of the preprint sheet and includes information about an orientation of printing a content that has already been printed on the preprint sheet set in a paper feed unit, a determination unit configured to determine whether processing according to a setting included in the print job cannot be executed unless the orientation setting method of the preprint sheet is changed even if image data included in the print job is rotated, according to the orientation information acquired by the acquisition unit and the setting included in the print job, and an orientation setting method display unit configured, if it is determined by the determination unit that the processing according to the setting included in the print job cannot be executed unless the orientation setting method of the preprint sheet is changed even if the image data included in the print job is rotated, to display an appropriate orientation setting method of the preprint sheet with which the processing according to the setting included in the print job can be executed on the preprint sheet.

According to an aspect of the present invention, because an operator is instructed to correct an orientation of setting a preprint sheet only if it is necessary to do so, it can reduce occurrence of correction operations. Further, according to an aspect of the present invention, in correcting the orientation of the preprint sheet, a message indicating an appropriate orientation of setting the preprint sheet is displayed. Therefore, an operator may not feel annoyed about the orientation of setting the preprint sheet, and work efficiency may be improved. In addition, occurrence of a printing error due to wrong oriented preprint sheet may be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 is a cross sectional view of the printing system.

FIG. 4 schematically illustrates an example of an operation unit.

FIG. 9 illustrates an exemplary operation for executing stapling and punching processing.

FIG. 10 is a flow chart illustrating an example of basic processing according to an exemplary embodiment of the present invention.

FIG. 12A illustrates an example of a paper feed unit designation screen. FIG. 12C illustrates an example of a paper type selection screen. FIG. 12D illustrates an example of an orientation information setting screen. FIG. 12E illustrates an example of a setting screen for setting information about an orientation of a first surface of a two-sided preprint sheet.

DESCRIPTION OF THE EMBODIMENTS

Various exemplary embodiments, features, and aspects of the invention will be described in detail below with reference to the drawings.

Figure 1:
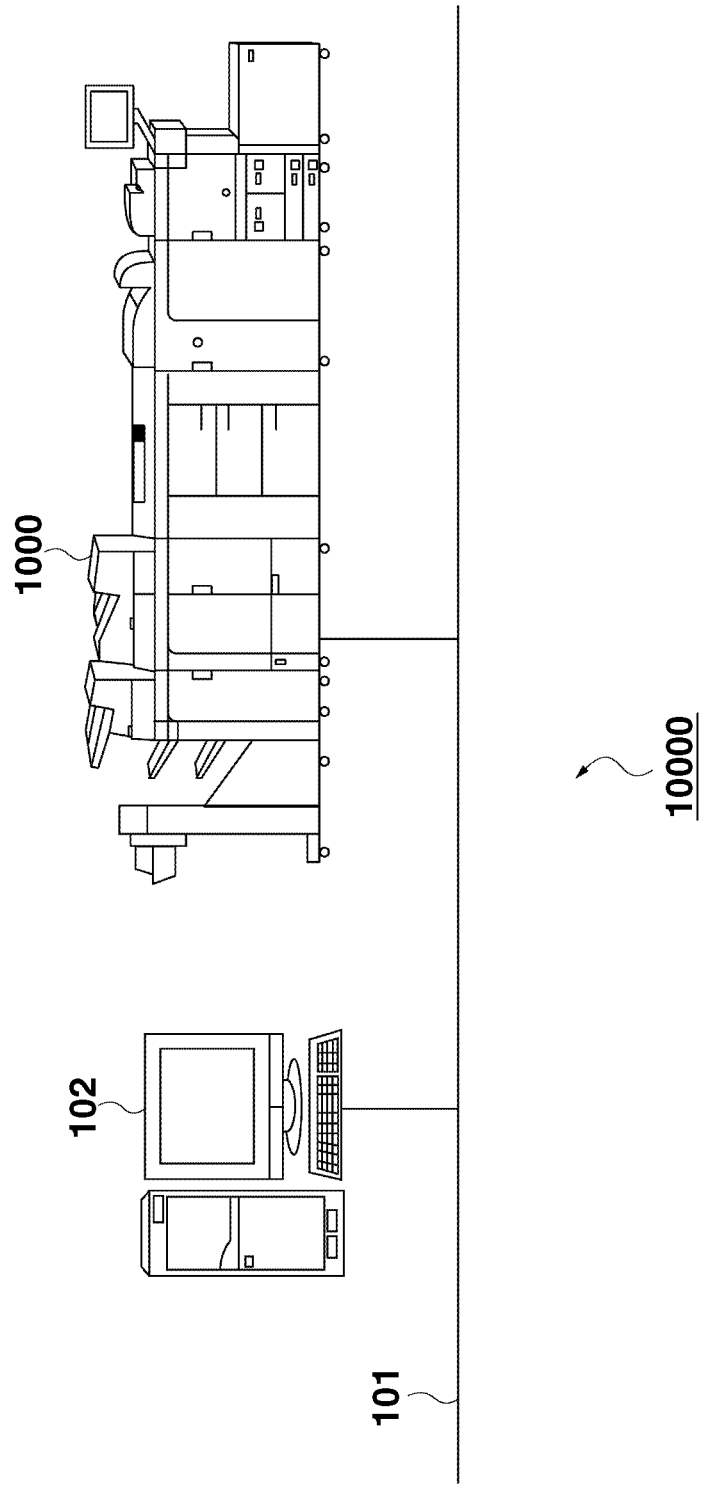
FIG. 1 illustrates an example of a system configuration according to an exemplary embodiment of the present invention.

A first exemplary embodiment of the present invention will be described in detail below with reference to attached drawings. Referring to FIG. 1, a POD system 10000 includes a printing system 1000 and a client computer 102 (hereinafter simply referred to as a personal computer (PC) 102), which are in communication with each other via a network 101. The PC 102 transmits page description language (PDL) code data to the printing system 1000 via the network 101.

Figure 2:
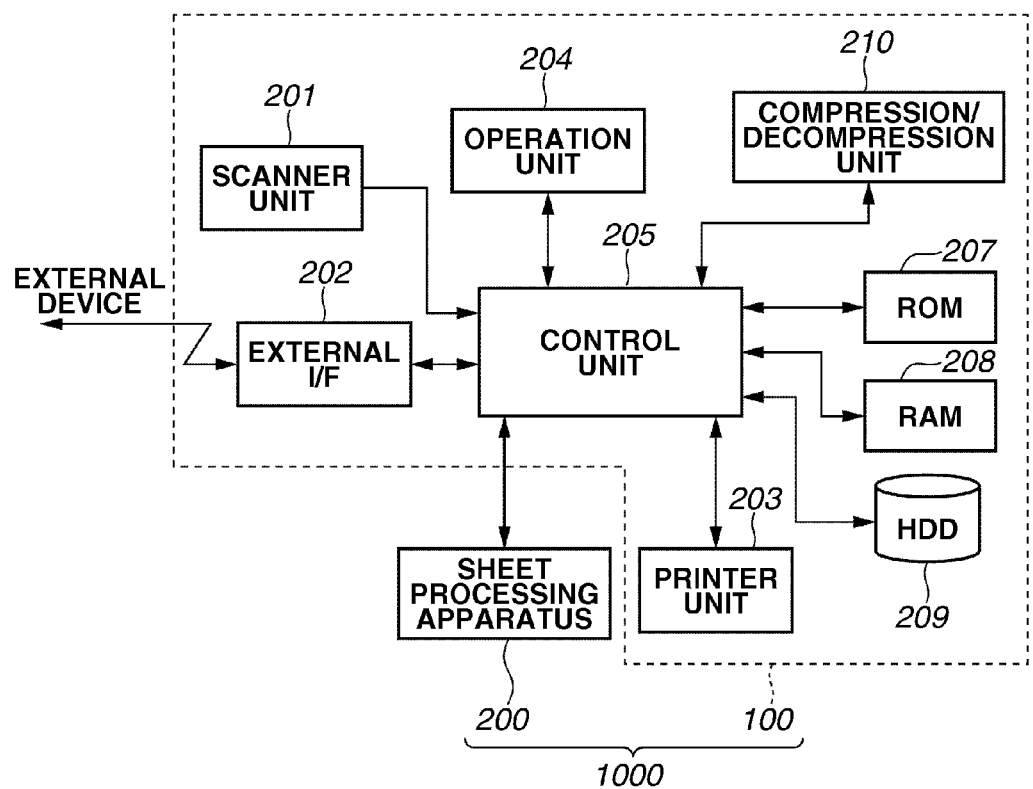
FIG. 2 is a block diagram illustrating an example of a printing system.

A configuration of the printing system 1000 will be described below with reference to a system block diagram illustrated in FIG. 2. The printing system 1000 includes an image forming apparatus 100 which are units surrounded by dotted lines in FIG. 2 and a sheet processing apparatus 200. An arbitrary number of sheet processing apparatuses 200 can be connected to the image forming apparatus 100.

In the present exemplary embodiment, a multifunction peripheral (MFP) which has a plurality of functions, such as a copy function and a printer function is used as the image forming apparatus 100. However, the image forming apparatus 100 may be a single-function image forming apparatus having a copy function or a printer function only. In the present exemplary embodiment, the printing system 1000 has the following various configurations as examples. Moreover, in the present exemplary embodiment, the printing system 1000 includes the image forming apparatus 100 and the sheet processing apparatus 200 as separate apparatuses. However, the entire printing system 1000 may be used as the image forming apparatus.

The printing system 1000 is capable of executing sheet processing on a sheet printed on the image forming apparatus 100 by using the sheet processing apparatus 200, which is connected to the image forming apparatus 100. However, the printing system 1000 may include the image forming apparatus 100 only without connecting the sheet processing apparatus 200 to the image forming apparatus 100. The sheet processing apparatus 200 can communicate with the image forming apparatus 100. The sheet processing apparatus 200 receives an instruction from the image forming apparatus 100 to perform sheet processing to be described below. A scanner unit 201 reads an image of an original document, converts the read document image into image data, and transfers the converted image data to another unit. An external interface (I/F) unit 202 transmits and receives data to and from another apparatus that is in communication with the external I/F unit 202 via the network 101.

A printer unit 203 prints an image on a sheet based on input image data. An operation unit 204 has a configuration illustrated in FIG. 4. More specifically, the operation unit 204 includes a hard key input unit a (key input unit) 402 and a touch panel 401, and receives an instruction from a user via the key input portion 402 and the touch panel 401. The operation unit 204 provides various displays on the touch panel 401 included therein.

A control unit 205 controls processing and operations of the various units included in the printing system 1000. More specifically, the control unit 205 controls the operations of the image forming apparatus 100 and the sheet processing apparatus 200 connected to the image forming apparatus 100.

A read-only memory (ROM) 207 stores various computer programs to be executed by the control unit 205. For example, the ROM 207 stores a program used for executing various processing by the control unit 205, which is illustrated in the following flow charts, and a display control program used for displaying the following various setting screens. In addition, the ROM 207 stores a program used to allow the control unit 205 to interpret PDL code data received from the PC 102 and to rasterize the interpreted data into raster image data. Further, the ROM 207 stores a boot sequence, font information, and the like.

A random access memory (RAM) 208 stores image data transmitted from the scanner unit 201 or the external I/F unit 202, PDL code data, and various programs and setting information loaded from the ROM 207. Further, the RAM 208 stores information about the sheet processing apparatus 200 (information about a type and a function of the sheet processing apparatuses 200 connected to the image forming apparatus 100). The control unit 205 can utilize the information about the sheet processing apparatus 200, which is stored on the RAM 200, in executing control.

A hard disk drive (HDD) 209 includes a hard disk and a drive unit used for reading and writing data from and onto the hard disk. The HDD 209 is a mass storage device which stores image data input from the scanner unit 201 and compressed by a compression/decompression unit 210. The control unit 205 can perform printing of the image data stored in the HDD 209 by using the printer unit 203 according to an instruction from the user.

The HDD 209 is also used as a spooler. More specifically, the control unit 205 can manage the PDL code data received from the PC 102 as a job and store the job on the HDD 209. Further, the control unit 205 can manage the jobs stored on the HDD 209 and acquire the number of jobs stored on the HDD 209 and setting information set to each job. The compression/decompression unit 210 performs an operation for compressing and decompressing image data stored in the RAM 208 or the HDD 209 according to various compression systems, such as Joint Bi-level Image Experts Group (JBIG) and Joint Photographic Experts Group (JPEG).

A configuration of the printing system 1000 will now be described with reference to FIG. 3. FIG. 3 is a cross sectional view of the image forming apparatus 100 and the sheet processing apparatus 200 which is connected to the image forming apparatus 100. In the example illustrated in FIG. 3, the sheet processing apparatus 200 includes a gluing bookbinding machine 200-3a and a saddle stitch binding machine 200-3b.

Referring to FIG. 3, an auto document conveyance apparatus (auto document feeder (ADF)) 301 separates a document placed on top of a document bundle set on a stacking surface of a document tray in a stacking order and conveys the separated document onto a document positioning glass to scan the document with a scanner 302. The scanner 302 reads an image on the document conveyed onto the document positioning glass and converts the read image into image data with a charge-coupled device (CCD). A ray, such as a laser beam, modulated according to image data is made incident by a rotational polygonal mirror 303 on the document. The ray reflected from the document falls on a surface of a photosensitive drum 304 via a reflection mirror as reflection scanning light. A latent image formed on the surface of the photosensitive drum 304 with the laser beam is developed with a toner. A toner image is transferred onto a sheet attached onto a surface of a transfer drum 305. By serially performing a series of image forming processing on toners of colors of yellow (Y), magenta (M), cyan (C), and black (K), a full color image is formed.

After performing image forming processing for four times, the sheet on the transfer drum 305, onto which a full color image has been formed, is separated by a separation claw 306. The separated sheet is conveyed to a fixing device 308 by a pre-fixing conveyance device 307. The fixing device 308 includes rollers and a belt in combination with one another. The fixing device 308 further includes a heat source, such as a halogen heater, and melts and fixes the toner on the sheet, onto which the toner image has been transferred, with heat and pressure. A paper discharge flapper 309 can swing around a swinging axis and regulates a direction of conveying a sheet. When the paper discharge flapper 309 swings clockwise in FIG. 3, a sheet is conveyed in a straight direction and then is discharged to the outside of the image forming apparatus 100 by a paper discharge roller 310. By executing a series of processing described above, the control unit 205 controls the image forming apparatus 100 so that the image forming apparatus 100 performs one-sided printing.

In forming images on both sides of a sheet, the paper discharge flapper 309 swings counterclockwise in FIG. 3. The conveyance direction of the sheet is changed to a downward direction to convey the sheet to a two-sided conveyance unit. The two-sided conveyance unit includes a reverse flapper 311, a reverse roller 312, a reverse guide 313, and a two-sided tray 314. The reverse flapper 311 swings around a swinging axis and regulates the direction of conveying a sheet. In performing a two-sided print job, the control unit 205 performs control so that the reverse flapper 311 swings counterclockwise in FIG. 3 to convey a sheet whose first surface is already printed by using the printer unit 203 into the reverse guide 313 via the reverse roller 312. The control unit 205 temporarily stops the reverse roller 312 in a state where a trailing edge of the sheet is pinched by the reverse roller 312, and then allows the reverse flapper 311 to swing clockwise in FIG. 3. Further, the control unit 205 allows the reverse roller 312 to rotate in a reverse direction. Thus, the sheet is switched back to be conveyed. The control unit 205 performs control to guide the sheet to the two-sided tray 314 in the state where the leading edge and the trailing edge of the sheet have been changed in position.

The sheet is temporarily stacked on the two-sided tray 314. The sheet is then conveyed to a registration roller 316 by a re-feed roller 315. At this time, the sheet is fed with a side thereof opposite to the first surface used in the transfer processing facing the photosensitive drum 304. Then, the control unit 205 performs control to form an image on the second surface of the sheet as in the processing described above. Thus, images are formed on both sides of the sheet. After fixing processing is completed, the sheet is discharged to the outside of the image forming apparatus 100 via the paper discharge roller 310. By serially performing the processing described above, the control unit 205 controls the image forming apparatus 100 to perform two-sided printing.

In the example illustrated in FIG. 3, focusing on a positional relationship between the photosensitive drum 304 and the sheet material, the printing is executed from the right side of the sheet material. However, another image forming apparatus may be configured to execute printing from the left side of a sheet material. The difference between these configurations will be described in detail below with reference to FIGS. 5A and 5B.

Figure 5A:
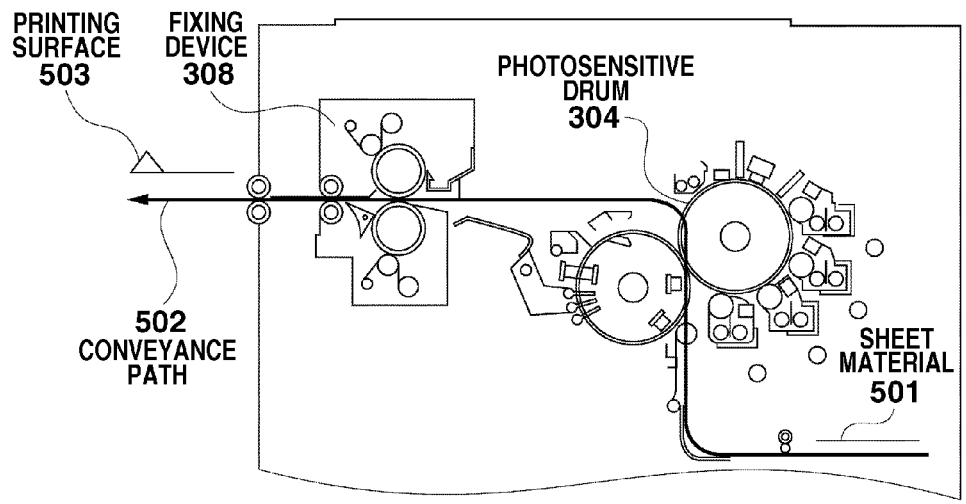
FIG. 5A is a cross sectional view of a right-drum type printing mechanism.

FIG. 5A illustrates an example of a right-drum type printing mechanism, in which printing is executed from a right side of a sheet material 501 similar to the configuration illustrated in FIG. 3. In the example illustrated in FIG. 5A, a sheet conveyance path 502 is indicated with an arrow drawn with a thick line. If this type of printing mechanism is used, printing is performed on a front surface of the sheet material 501 (i.e., on a surface facing upwards), which is fed and conveyed along the sheet conveyance path 502. Further, the sheet material 501 is then discharged with its printing surface facing upwards as illustrated by a printing surface 503.

Figure 5B:
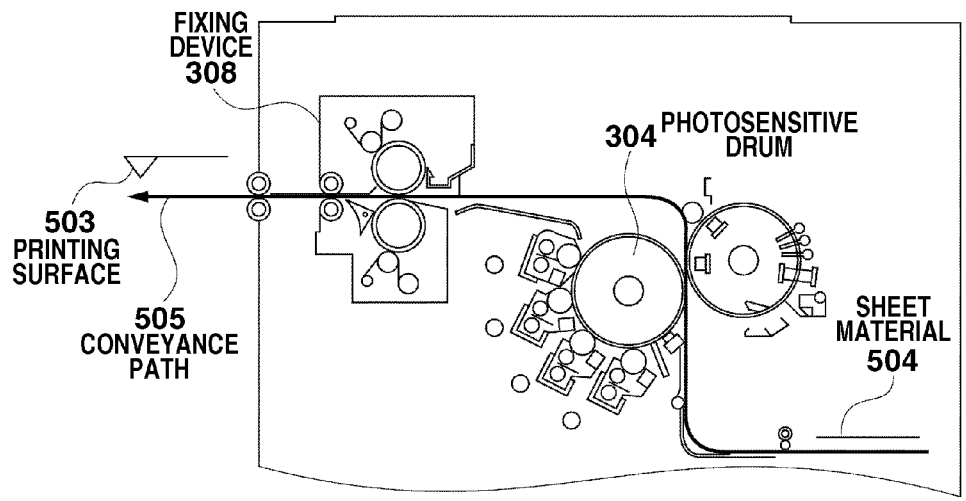
FIG. 5B is a cross sectional view of a left-drum type printing mechanism.

On the other hand, FIG. 5B illustrates an example of a left-drum type printing mechanism, by which printing is executed from a left side of a sheet material 504, unlike the configuration illustrated in FIG. 3. In the example illustrated in FIG. 5B, a sheet conveyance path 505 is indicated with an arrow drawn with a thick line. If this type of printing mechanism is used, printing is performed on a back surface of the sheet material 504 (i.e., on a surface facing downwards) which is fed and conveyed along the sheet conveyance path 505. Further, the sheet material 504 is then discharged with its printing surface facing downwards as illustrated by the printing surface 503. As described above, according to the difference of the printing mechanisms, a surface of a sheet fed and conveyed on which printing is performed and an orientation of a printed surface on the sheet to be discharged may differ.

Returning to the description of the configuration of the image forming apparatus 100, the image forming apparatus 100 includes a paper feed unit for storing sheets used for print processing. The paper feed unit includes paper feed cassettes 317 and 318, each of which can store five hundred sheets, for example, a paper feed deck 319, which can store five thousand sheets, for example, and a manual feed tray 320. Various sheets of different sizes and materials can be respectively set in the paper feed cassettes 317 and 318 and the paper feed deck 319. In the manual feed tray 320, various types of sheets including a special sheet, such as an overhead projector (OHP) sheet, can be set. In this application, above described mechanisms related to image forming including the printing mechanism and the paper feed mechanism in the image forming apparatus 100 are collectively referred to as an image forming mechanism.

Each of the paper feed cassettes 317 and 318, the paper feed deck 319, and the manual feed tray 320 includes a paper feed roller. Sheets can be serially fed one by one by the paper feed roller. Focusing on the paper feed/conveyance mechanism that the paper feed unit employs, the mechanism used when feeding a sheet from the paper feed cassettes 317 and 318 is different from the mechanism used when feeding a sheet from the manual feed tray 320.

Figure 6A:
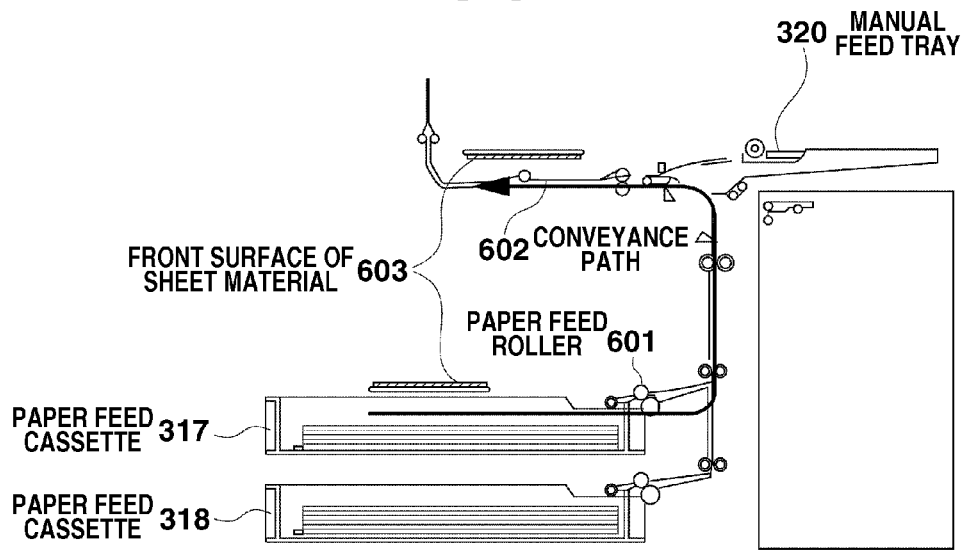
FIG. 6A is a cross sectional view of a paper feed mechanism that employs a reverse paper feed method.

The difference between these cases will be described in detail below with reference to FIGS. 6A and 6B. FIG. 6A illustrates an example of a case in which a sheet is fed from the paper feed cassettes 317 and 318. In FIG. 6A, the sheet is fed and conveyed along a sheet conveyance path 602 which is drawn with a thick arrow. In the example illustrated in FIG. 6A, a front surface 603 of a sheet material fed by a paper feed roller 601 from the paper feed cassettes 317 and 318 is reversed to face downwards while being conveyed along the sheet conveyance path 602. I.e., the sheet material is conveyed by a reverse conveyance method in this case.

Figure 6B:
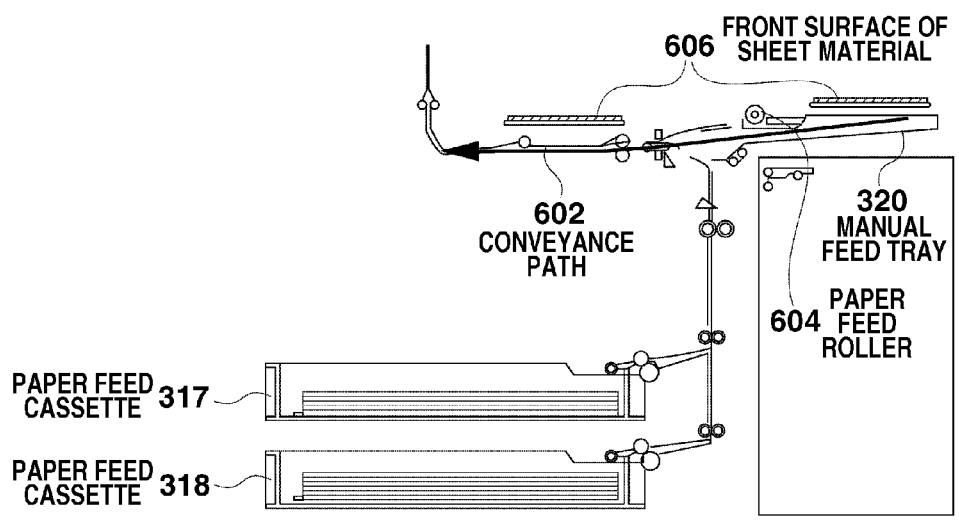
FIG. 6B is a cross sectional view of a paper feed mechanism that does not employ a reverse paper feed method.

On the other hand, FIG. 6B illustrates an example of a case in which a sheet is fed from the manual feed tray 320. Referring to FIG. 6B, the sheet is fed and conveyed along a sheet conveyance path 605 which is drawn with a thick arrow in FIG. 6B. In the example illustrated in FIG. 6B, a front surface 606 of a sheet material fed by a paper feed roller 604 from the manual feed tray 320 is not reversed to keep facing upwards while being conveyed along the sheet conveyance path 605. As described above, in conveying a sheet from the paper feed unit to the image forming unit including the photosensitive drum 304, paper feed mechanisms of different configurations may feed and convey the sheet on different orientations of the surface of the sheet.

The sheet processing apparatus 200 illustrated in FIG. 3 will be described. In the printing system 1000 according to the present exemplary embodiment, an arbitrary number of arbitrarily different types of sheet processing apparatuses 200 can be connected as long as a sheet can be conveyed from an upstream apparatus to a downstream apparatus via a sheet conveyance path. For example, as illustrated in FIG. 3, the sheet processing apparatuses 200 can include a gluing bookbinding machine 200-3a and a saddle stitch binding machine 200-3b in this order from the image forming apparatus 100. The gluing bookbinding machine 200-3a and the saddle stitch binding machine 200-3b can be selectively used by the printing system 1000. Each of the sheet processing apparatuses 200 includes a sheet discharge unit. A user can take out the sheet that has been subjected to sheet processing from the sheet discharge unit of each of the sheet processing apparatuses 200.

The control unit 205 receives a request for performing sheet processing desired by the user from among a plurality of types of sheet processing options that can be performed by the sheet processing apparatus 200 connected with the image forming apparatus 100 together with a request for performing printing via the operation unit 204. When the control unit 205 receives the request for performing printing of a job to be processed from the user via the operation unit 204, the control unit 205 performs the print processing requested for the job with using the printer unit 203. The control unit 205 allows the sheet on which the print processing has been performed to be conveyed to the sheet processing apparatus 200 that can perform the sheet processing desired by the user via the sheet conveyance path and allows the sheet processing apparatus 200 to perform the sheet processing on the conveyed sheet.

Suppose that the printing system 1000 has the configuration illustrated in FIG. 3 and the job to be processed whose request for printing has been received from the user is a job that has been instructed to be subjected to sheet processing by the gluing bookbinding machine 200-3a. The gluing bookbinding machine 200-3a performs, for example, gluing bookbinding processing, such as case binding processing or top gluing binding. The job is herein referred to as a "gluing bookbinding job".

When the gluing bookbinding job is performed in the system having the configuration illustrated in FIG. 3, the control unit 205 allows a sheet printed by the image forming apparatus 100 to be conveyed into the inside of the gluing bookbinding machine 200-3a via a point A illustrated in FIG. 3. After that, the control unit 205 causes the gluing bookbinding machine 200-3 to perform the gluing bookbinding processing of the job. Then, the control unit 205 allows the print product of the job on which the gluing bookbinding processing has been performed by the gluing bookbinding machine 200-3a to be held in a paper discharge destination Y in the gluing bookbinding machine 200-3a, without conveying the print product to another apparatus (for example, an apparatus in a later stage).

The processing executed by the gluing bookbinding machine 200-3a will be further described in detail below with reference to FIG. 7. The gluing bookbinding machine 200-3a conveys a sheet conveyed from an upstream apparatus selectively into either one of three conveyance paths. The conveyance paths include a cover path 701, a bookblock path 706, and a straight path 705. In addition, the gluing bookbinding machine 200-3a includes an inserter path 714. The inserter path 714 is a sheet conveyance path used for conveying a sheet placed on an inserter tray 713 into the cover path 701 and the bookblock path 706.

Figure 7:
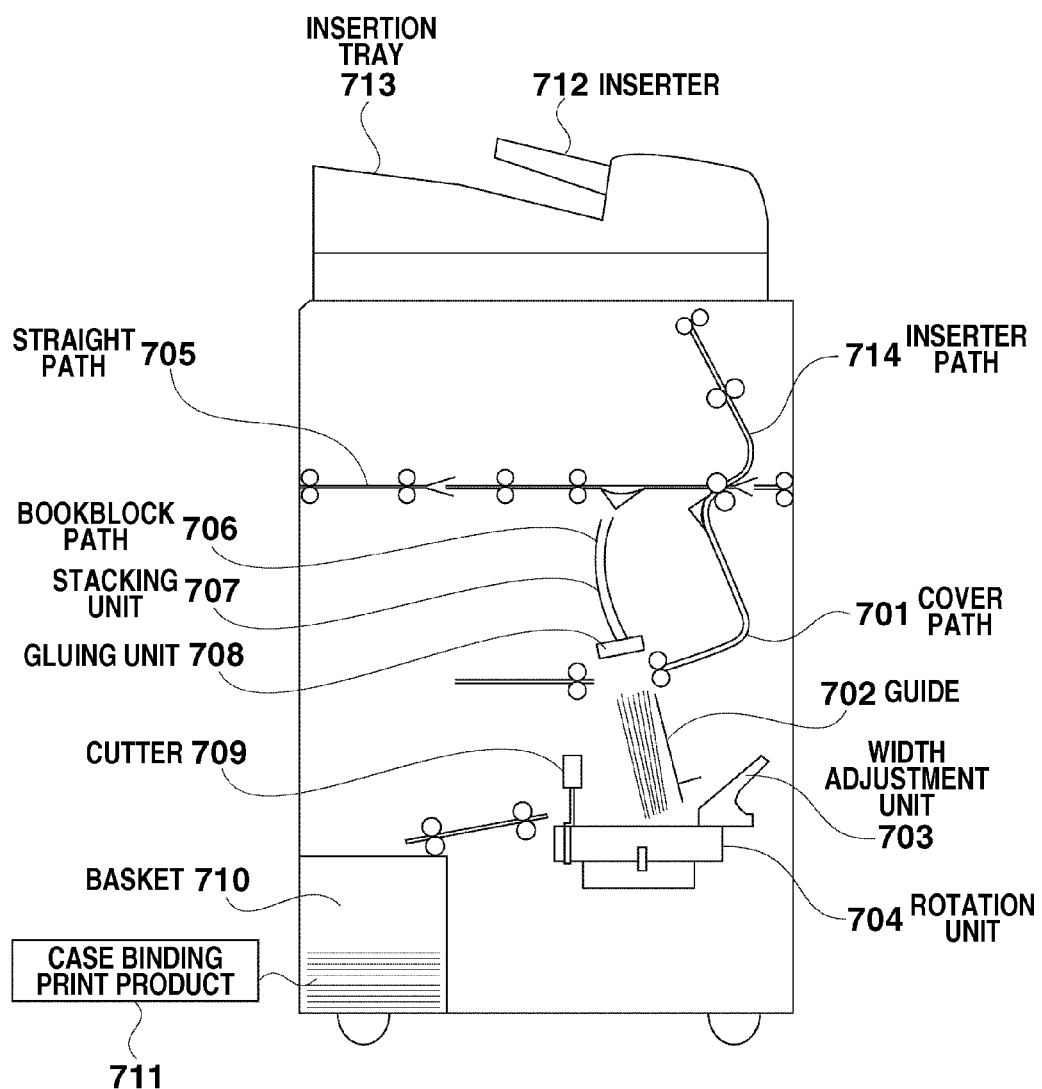
FIG. 7 is a cross sectional view of a gluing bookbinding machine.

The straight path 705 of the gluing bookbinding machine 200-3a in FIG. 7 is a sheet conveyance path used for conveying a sheet of a job that does not require gluing bookbinding processing by the gluing bookbinding machine 200-3a to a sheet processing apparatus 200 provided on a later stage. The bookblock path 706 and the cover path 701 of the gluing bookbinding machine 200-3a in FIG. 7 are sheet conveyance paths used for conveying a sheet necessary for generating a case binding printed product.

For example, when a user instruction for executing case binding processing by using the gluing bookbinding machine 200-3a is given, the control unit 205 executes control for conveying a sheet conveyed from an upstream apparatus into the bookblock path 706 as a sheet for a bookblock (textblock) used in the case binding processing. In order to generate one case binding printed product, a sheet bundle of the text for one book is wrapped with one cover sheet. The sheet bundle of the text used in case binding is herein referred to as a "book-block" (or "textblock"). Then the control unit 205 executes control for conveying a sheet for a cover to be used in the case binding processing into the cover path 701. In addition, the control unit 205 executes control for performing processing for wrapping the bookblock that has been conveyed into the cover path 701 with the cover sheet that has also been conveyed via the cover path 701.

Moreover, as well as being capable of executing processing on the sheet that has been conveyed from an upstream apparatus, the gluing bookbinding machine 200-3a can convey the sheet set on the inserter tray 713 included in the gluing bookbinding machine 200-3a and execute case binding processing and top gluing binding processing on the sheet within the gluing bookbinding machine 200-3a itself.

For example, the control unit 205 allows the bookblock sheets conveyed from the image forming apparatus 100 to be serially stacked in a stacking unit 707 via the bookblock path 706 in FIG. 7. When the bookblock sheets are stacked in the stacking unit 707 in an amount equivalent to the number of sheets for one book, the control unit 205 allows one cover sheet required in the job to be conveyed from the inserter tray 713 of the inerter 712 via the inerter path 714 and the cover path 701.

The control unit 205 controls a gluing unit 708 to perform gluing processing on a spine portion of one set of the sheet bundle that is equivalent to the bookblock. After that, the control unit 205 controls the gluing unit 708 to attach the spine portion of the bookblock to a central portion of the cover sheet. When attaching the bookblock to the cover, the bookblock is conveyed while being pressed downward to a lower portion of the gluing bookbinding machine 200-3a. Thus, the control unit 205 performs processing for folding the cover sheet to wrap the bookblock with one cover sheet.

Subsequently, one set of sheet bundle is stacked on a rotation unit 704 along a guide 702 in FIG. 7. After one set of sheet bundle is set on the rotation unit 704 in FIG. 7, the control unit 205 performs processing for cutting the sheet bundle with a cutter 709 in FIG. 7. At that time, the cutter 709 can perform three-side trimming processing, in which three sides except for the edge corresponding to the spine portion of one set of the sheet bundle are cut. Subsequently, the control unit 205 presses the sheet bundle that has been trimmed in three sides toward a basket 710 using a width adjustment unit 703 to store the sheet bundle in the basket 710.

Focusing on the mechanism of the gluing bookbinding machine 200-3a, the gluing bookbinding machine 200-3a stacks the bookblock in the stacking unit 707, glues the stacked bookblock on a lower portion of the gluing bookbinding machine 200-3a, and wraps the glued bookblock with the cover sheet by pressing further downward of the gluing bookbinding machine 200-3a. With this configuration, the gluing bookbinding machine 200-3a can execute gluing on the sheet bundle stacked in the stacking unit 707 on the same side thereof only. In other words, the gluing bookbinding machine 200-3a having the above described configuration can bind the sheet bundle on one edge only. Accordingly, if the user desires to produce a print product bound on the other edge, it is necessary to rotate the image to be printed by 180 degrees.

Further, for example, in the case of the system configuration illustrated in FIG. 3, suppose that a job to be processed whose request for printing has been received from the user is a job that has been instructed to be subjected to sheet processing by using the saddle stitch binding machine 200-3b. The sheet processing performed by the saddle stitch binding machine 200-3b includes, for example, saddle stitch binding processing, punching processing, cutting processing, shift discharge processing, folding processing, and stapling processing. The job is herein referred to as a "saddle stitch binding job".

In processing the saddle stitch binding job in the system configuration in FIG. 3, the control unit 205 allows a sheet of the job printed by the image forming apparatus 100 to pass points A and B in FIG. 3 to be conveyed to the saddle stitch binding machine 200-3b. After that, the control unit 205 performs the sheet processing of the job using the saddle stitch binding machine 200-3b. Then, the control unit 205 allows the print product of the saddle stitch binding job that has been subjected to the sheet processing using the saddle stitch binding machine 200-3b to be held in a paper discharge destination Z in the saddle stitch binding machine 200-3b. The paper discharge destination Z includes a plurality of paper discharge destination options. Since the saddle stitch binding machine 200-3b can perform a plurality of types of sheet processing, the plurality of paper discharge destination options can be used to sort the discharge destinations corresponding to the types of the sheet processing.

Figure 8:
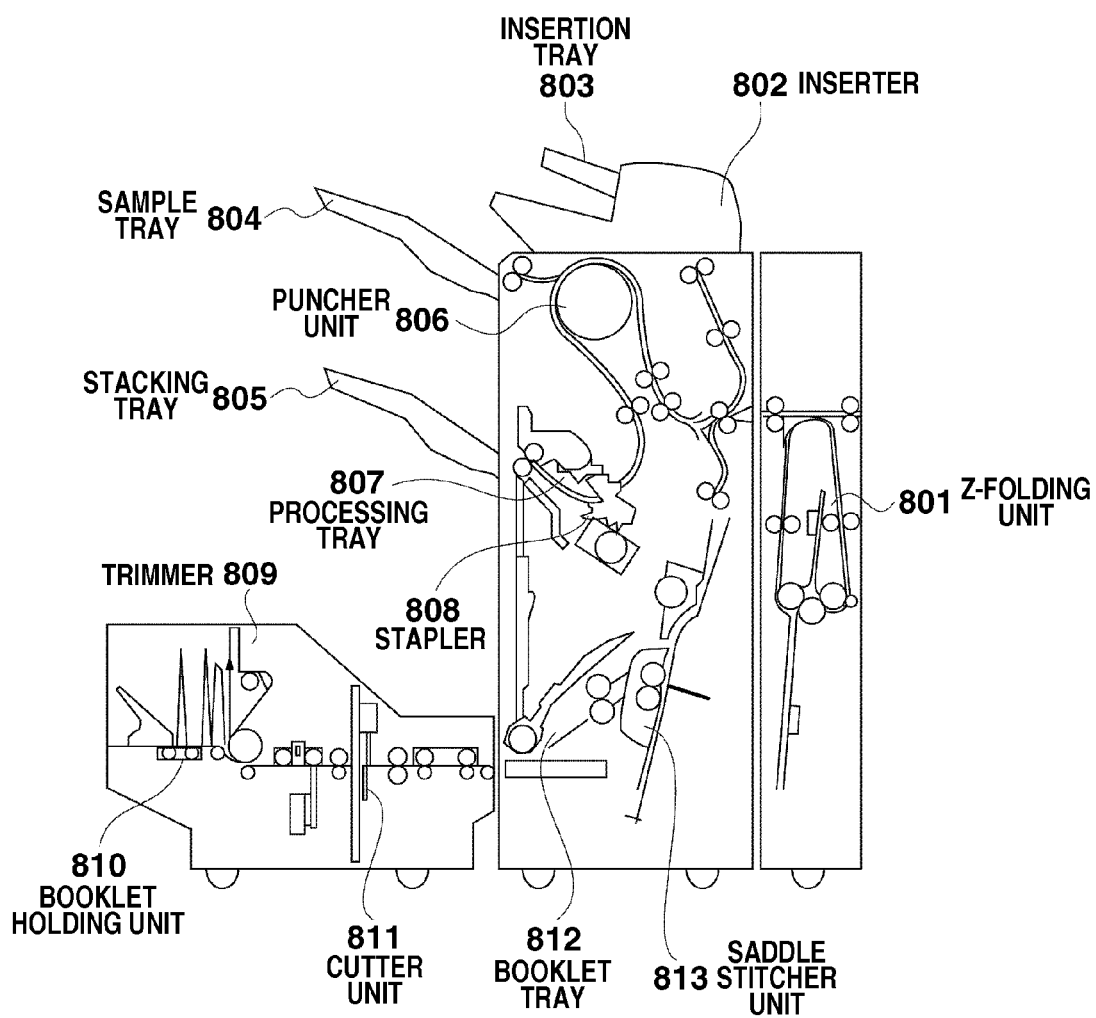
FIG. 8 is a cross sectional view of a saddle stitch binding machine.

An example of processing executed by the saddle stitch binding machine 200-3b will be described below with reference to FIG. 8. Referring to FIG. 8, the saddle stitch binding machine 200-3b includes various units provided for selectively performing stapling processing, punching processing, cutting processing, saddle stitch binding processing, and Z-folding processing on a sheet conveyed from an upper apparatus. Further, the saddle stitch binding machine 200-3b does not include a straight path that functions as a sheet conveyance path to a downstream apparatus. Accordingly, when a plurality of sheet processing apparatuses 200 is connected to the image forming apparatus 100, the saddle stitch binding machine 200-3b is connected as the last apparatus, as illustrated in FIG. 3. In addition, the saddle stitch binding machine 200-3b includes a sample tray 804 and a stacking tray 805 outside the machine and a booklet tray 812 inside the machine, as illustrated in FIG. 8. Furthermore, the saddle stitch binding machine 200-3b includes an inserter 802. The user can insert a sheet fed and conveyed from the inserter 802 to the sheets conveyed from an upstream apparatus.

When the control unit 205 receives an instruction to perform stapling with the saddle stitch binding machine 200-3b, the control unit 205 allows sheets printed by the image forming apparatus 100 and conveyed thereto to be serially stacked into a processing tray 807 which is provided inside the saddle stitch binding machine 200-3b. After the sheets for one sheet bundle are stacked on the processing tray 807, the control unit 205 performs stapling by a stapler 808. Then, the control unit 205 discharges the stapled sheet bundle from the processing tray 807 to the stacking tray 805 in FIG. 8.

When the control unit 205 is instructed to perform punching processing using the saddle stitch binding machine 200-3b, the control unit 205 performs punching processing on the sheet printed by the image forming apparatus 100 and conveyed thereto by a puncher unit 806. Then, the control unit 205 allows the sheet to pass through the saddle stitch binding machine 200-3b and to be discharged onto a discharge tray, such as the stacking tray 805 or the sample tray 804.

When the control unit 205 is instructed to perform saddle stitch binding using the saddle stitch binding machine 200-3b, the control unit 205 executes control for conveying the sheet printed by the image forming apparatus 100 and conveyed thereto to a saddle stitcher unit 813. The control unit 205 causes the saddle stitcher unit 813 to perform binding at two positions in a central portion of the sheet bundle including a plurality of sheets for one set. After that, the control unit 205 performs two-folding using the central portion of the sheet bundle as a reference by engaging the central portion of the sheet bundle with a roller. Thus, a leaflet-like booklet can be produced. The sheet bundle on which the saddle stitch binding processing has been performed using the saddle stitcher unit 813 is conveyed to the booklet tray 812.

When the control unit 205 receives an instruction to perform cutting processing on the saddle stitch binding job, the control unit 205 conveys the saddle stitch-bound sheet bundle from the booklet tray 812 to a trimmer 809. Subsequently, the control unit 205 cuts the sheet bundle conveyed to the trimmer 809 with a cutter unit 811 and stores the sheet bundle in a booklet holding unit 810. When the saddle stitch binding machine 200-3b does not include the trimmer 809, the sheet bundle bound with the saddle stitcher unit 813 can be taken out of the booklet tray 812.

When a job in which Z-folding is instructed to be performed by using the saddle stitch binding machine 200-3b is executed, the control unit 205 performs processing for folding the sheet printed by the image forming apparatus 100 and conveyed thereto in a Z-like shape using a Z-folding unit 801. Then, the control unit 205 allows the folded sheet to pass through the saddle stitch binding machine 200-3b and to be discharged onto a discharge tray, such as the stacking tray 805 or the sample tray 804.

The stapler 808 and the puncher unit 806 included in the saddle stitch binding machine 200-3b can execute processing only on the trailing edge of the sheet conveyed thereto. More specifically, as illustrated in FIG. 9, it is necessary to change an angle of the image to be printed by 180 degrees according to a case 901 in which the sheet is subjected to stapling at its upper-left corner and punching on its left edge, and a case 902 in which the sheet is subjected to stapling at its upper-right corner and punching on its right edge, is applied. In the present exemplary embodiment, stapling at the sheet upper-left corner and punching on the sheet left edge is finishing processing executed when the sheet bundle is set to be left open. On the other hand, stapling at the sheet upper-right corner and punching on the sheet right edge is finishing processing executed when the sheet bundle is set to be right open. According to the difference in the settings, i.e., which of the left-open finishing processing and the right-open finishing processing is executed, an orientation of an image to be printed needs to be rotated by 180 degrees. As described above, it becomes necessary to rotate the orientation of the image to be printed by 180 degrees according to the content of the sheet processing (finishing processing) set to the job similarly to the case of the gluing bookbinding machine 200-3a described above.

As described above, in the printing system 1000 according to the present exemplary embodiment, a plurality of sheet processing apparatuses can be connected to the image forming apparatus 100. The plurality of sheet processing apparatuses 200 can be connected to the printing apparatus 100 in an arbitrary combination thereof. In addition, the order of connecting the plurality of sheet processing apparatuses 200 can be freely changed as long as the sheet conveyance paths provided between apparatuses are surely connected to each other. Furthermore, a plurality of options of sheet processing apparatuses that can be connected to the image forming apparatus 100 are provided.

In the present exemplary embodiment, various user interfaces, which are provided by the printing system 1000 and capable of interactively responding to an operation executed by an operator, function as the above described execution request receiving unit. More specifically, the operation unit 204, soft keys and hard keys included in the operation unit 204, and/or various user interface screens illustrated in the drawings are examples of the execution request receiving unit. However, the above described examples of the execution request receiving unit are mere examples and the present invention is not limited to them. More specifically, a job execution request may be received from an external apparatus outside the printing system 1000. In this case, a user interface included in an external data generation source apparatus, such as the PC 102, functions as the execution request receiving unit.

An example of processing according to the present exemplary embodiment will be described in detail below with reference to FIG. 10. Referring to FIG. 10, in step S1001, the control unit 205 receives a print job. Then in step S1002, the control unit 205 determines whether the received job is a job that uses a preprint sheet according to the setting that has been set to the job.

If it is determined that the received job is a job that uses a preprint sheet (YES in step S1002), then the processing advances to step S1003. In step S1003, the control unit 205 acquires orientation information which indicates an appropriate orientation of the preprint sheet set in the paper feed unit. On the other hand, if it is determined that the received job is not a job that uses a preprint sheet (NO in step S1002), then the processing advances to step S1009. In step S1009, the control unit 205 does not execute the control characteristic to the present exemplary embodiment and executes control for executing a normal output.

Even if it is determined that the received job is not a job that uses a preprint sheet (NO in step S1002), the control unit 205 executes control for executing necessary processing, such as image rotation processing, according to the print setting set to the job. The above described necessary processing is similar to processing executed by a conventional method and is not characteristic to the present exemplary embodiment. Accordingly, detailed description thereof including description of processing in the flow charts will be omitted.

Figure 11A:
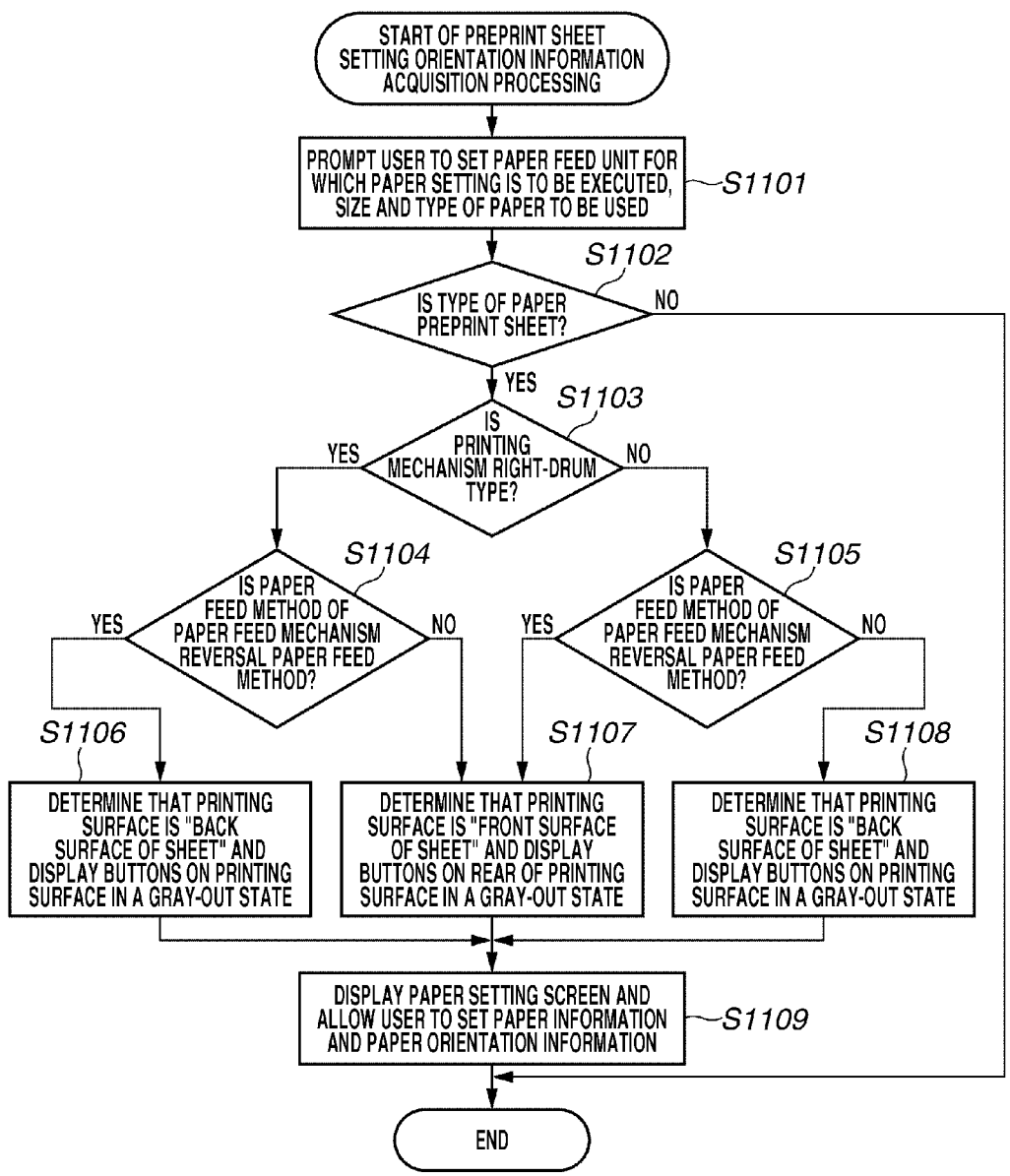
FIG. 11A is a flow chart illustrating an exemplary flow of orientation information acquisition processing.

Here, the flow chart in FIG. 11A is processing for setting preprint sheet orientation information, which is acquired in step S1003. In the present exemplary embodiment, it is supposed that the preprint sheet orientation information setting processing illustrated in FIG. 11A is executed previously to the processing illustrated in FIG. 10.

Now, the preprint sheet orientation information setting processing will be described in detail below with reference to FIG. 11A. The processing illustrated in FIG. 11A starts with an instruction to start paper setting input by an operator via the operation unit 204 as a trigger.

Referring to FIG. 11, after a paper setting start instruction is input by the operator, in step S1101, the control unit 205 executes control for displaying a screen illustrated in FIGS. 12A to 12F and allows the operator to set the paper feed unit to which the paper setting is performed, a paper size and a paper type of the sheet to be fed.

Figure 12B:
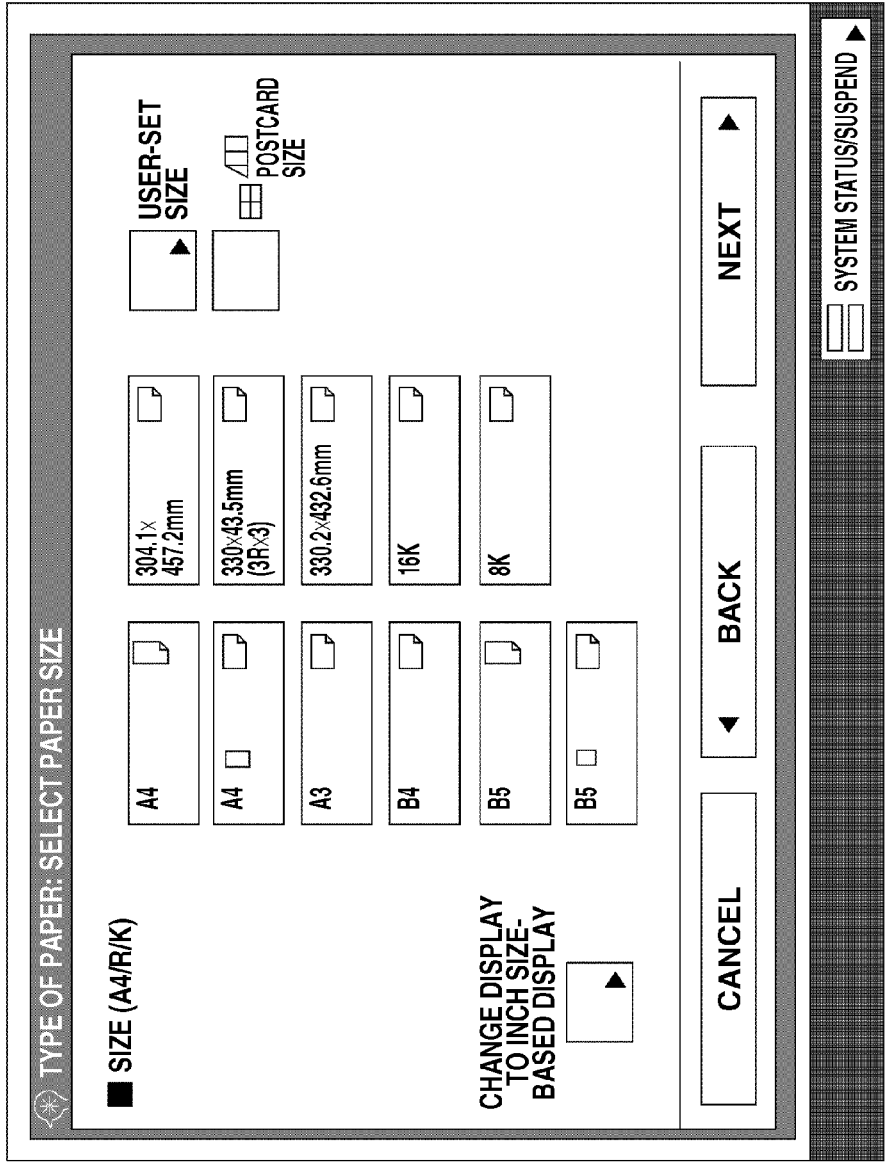
FIG. 12B illustrates an example of a paper size selection screen.

FIG. 12A illustrates an example of a paper feed unit designation screen. FIG. 12B illustrates an example of a paper size selection screen. FIG. 12C illustrates an example of a paper type selection screen.

In step S1102, the control unit 205 determines whether the type of the paper selected via the screen illustrated in FIG. 12C is a preprint sheet. If it is determined that the selected type of paper is not a preprint sheet (NO in step S1102), then the processing ends. On the other hand, if it is determined that the selected type of paper is a preprint sheet (YES in step S1102), then the processing advances to step S1103. In step S1103, the control unit 205 checks the type of the printing mechanism of the image forming apparatus 100, which is the target of control by the control unit 205. More specifically, in step S1103, the control unit 205 determines whether the type of the printing mechanism of the image forming apparatus 100 is the type that executes printing from the right side of the sheet material (i.e., the right-drum type printing mechanism) or the type that executes printing from the left side of the sheet material (i.e., the left-drum type printing mechanism).

In steps S1104 and S1105, the control unit 205 determines whether the paper feed mechanism of the paper feed unit designated by the operator via the screen illustrated in FIG. 12A is a reverse paper feed type printing mechanism. More specifically, the control unit 205 determines on which surface (front or back) of the preprint sheet set in the paper feed unit the printing is to be executed according to a result of the determination in steps S1104 and S1105.

Further specifically, if the printing mechanism is the right-drum type printing mechanism (YES in step S1103) and if the preprint sheet is to be set in the paper feed unit having the reverse paper feed function (YES in step S1104), then the processing advances to step S1106. In step S1106, the control unit 205 determines that printing is executed on the back surface (the surface facing downwards) of the set preprint sheet. On the other hand, if the printing mechanism is the left-drum type printing mechanism (NO in step S1103) and if the preprint sheet is to be set in the paper feed unit not having the reverse paper feed function (NO in step S1105), then the processing advances to step S1108. In step S1108, similar to step S1106, the control unit 205 also determines that printing is executed on the back surface (the surface facing downwards) of the set preprint sheet. In cases other than the cases described above, the processing advances to step S1107. In step S1107, the control unit 205 determines that the printing is executed on the front surface of the set preprint sheet.

In step S1109, the control unit 205 displays an orientation information setting screen illustrated in FIG. 12D on the touch panel unit 401 included in the operation unit 204 (setting screen display processing) and prompts the operator to input paper information and paper orientation information. The control unit 205 stores the information input in step S1109 on the RAM 208 as preprint sheet orientation information. Accordingly, in step S1003, the control unit 205 can acquire the preprint sheet orientation information from the RAM 208.

The orientation information set by the operator in step S1109 includes information about an orientation of printing of the content that has already been printed on the preprint sheet. In the present exemplary embodiment, the orientation of printing of the contents includes an orientation of a leading edge of the image included in the content (top of the image) and an orientation of the printed surface of the preprint sheet on which the content is printed. More specifically, four different orientation setting methods are available which are determined according to a combination of the orientation (front or rear) of the image leading edge from the user and on which surface (front or back) of the sheet the printing is executed.

When the control unit 205 displays the paper orientation information setting screen illustrated in FIG. 12D, the control unit 205 determines on which surface of the set sheet the printing is executed according to the image formation mechanism in steps S1103, S1105, and S1106. In addition, the control unit 205 executes control for previously disabling unnecessary items by graying out corresponding keys. More specifically, the control unit 205 determines whether image data is printed on the surface of the preprint sheet on which the content has been printed in each of the four sheet orientation setting methods.

Further, the control unit 205 displays the orientation information setting screen so that the user can select the orientation setting method by which the image data is printed on the surface having the content printed thereon as a necessary item. On the other hand, the control unit 205 displays the orientation information setting screen so that the user cannot select the orientation setting method by which the image data is not printed on the surface having the content printed thereon as an unnecessary item.

In the example illustrated in FIG. 12D, it is supposed that the control unit 205 has determined that printing is executed on the front surface of the set preprint sheet. Accordingly, on the setting screen illustrated in FIG. 12D, setting buttons for the orientation setting method for setting the sheet with the content-printed surface of the sheet facing downwards is grayed out so that the user cannot select the buttons.

If a two-sided preprint sheet is used, information about a binding edge of the sheet, i.e., which of two-sided printing by long-side binding and two-sided printing by short-side binding is to be executed, is considered. Accordingly, it is useful to classify the preprint sheet into one-sided and two-sided preprint sheet types and further to classify the two-sided printing into a long-side binding type and a short-side binding type to allow the user to select among them as the paper type selection screen illustrated in FIG. 12C. In this case, the control unit 205 may store information about the set binding orientation on the RAM 208 so that the stored information can be referred to in later stages.

When the orientation of a two-sided preprint sheet is set via the paper orientation information setting screen illustrated in FIG. 12D, a first page (front surface) of the two-sided preprint sheet is used as the reference to set the orientation as illustrated in FIG. 12E. With this configuration, it is enabled to apply the processing similar to the processing executed on a one-sided preprint sheet.

Figure 12F:
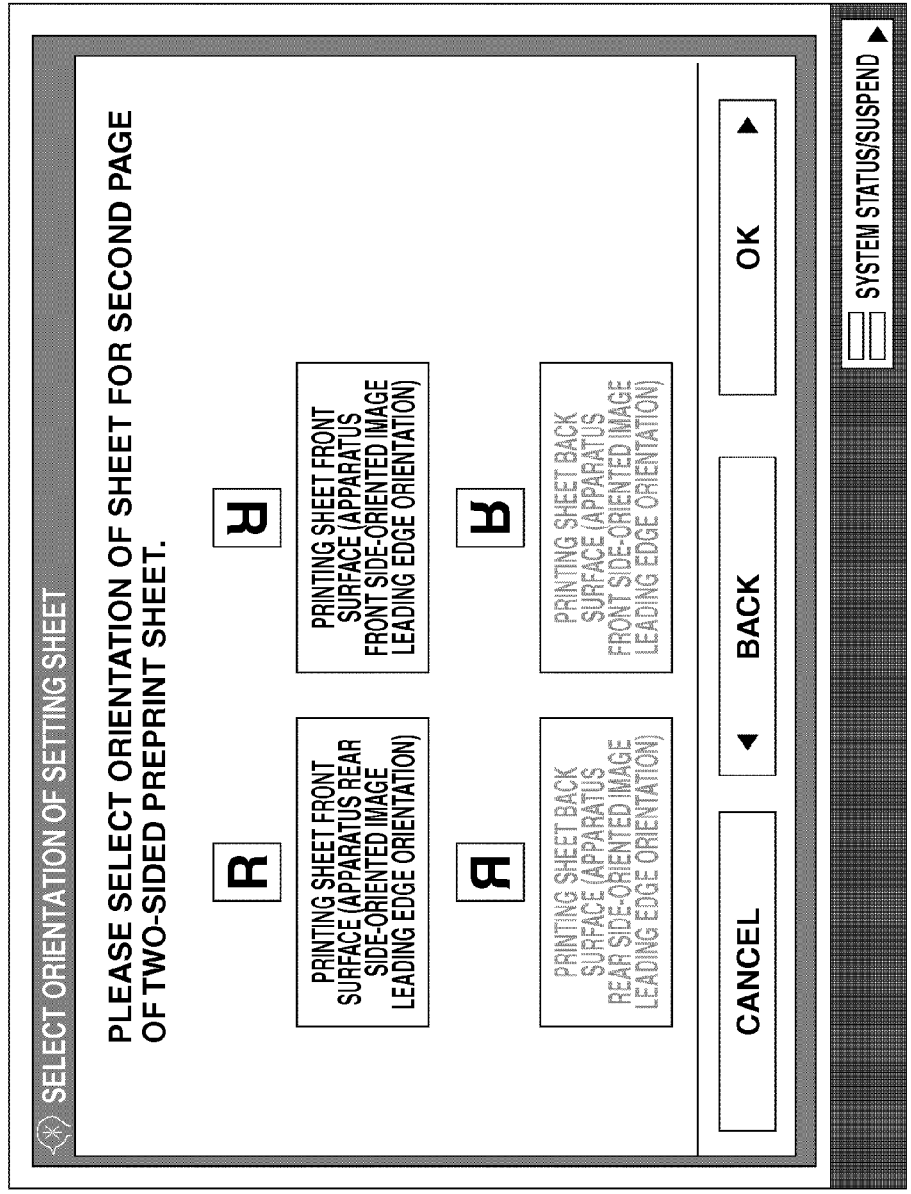
FIG. 12F illustrates an example of a setting screen for setting information about an orientation of a second surface of a two-sided preprint sheet.

Now, a case will be described below in which the setting of the two-sided preprint sheet is executed via the paper orientation information setting screen illustrated in FIG. 12D and in which it is necessary to set the two-sided preprint sheet with its first page (the front surface) facing downwards (processing in steps S1103 and S1106). In this case only, the orientation of setting the sheet may be set with the second page of the sheet (the back surface) as the reference as illustrated in FIG. 12F. With this configuration, in setting the sheet, the operator can set the orientation information in a state in which the content that has been printed on the preprint sheet can be easily visually verified.

Figure 11B:
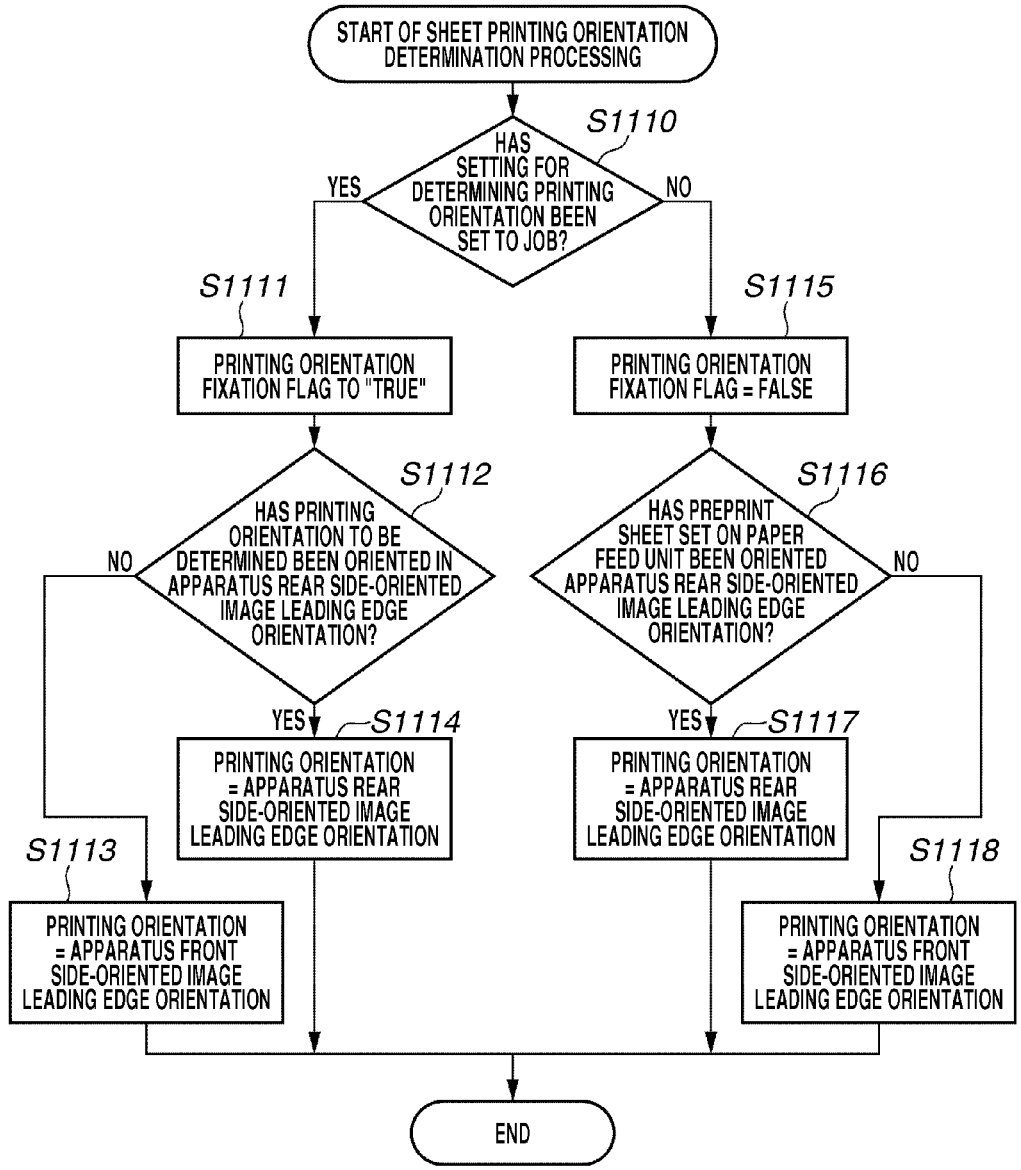
FIG. 11B is a flow chart illustrating an exemplary flow of sheet printing orientation determination processing.

Returning to the flow chart in FIG. 10, in step S1004, the control unit 205 executes processing for determining the orientation of printing on the preprint sheet. FIG. 11B is a flow chart illustrating an example of processing for determining the orientation of printing on the preprint sheet in step S1004. The printing orientation determination processing in step S1004 will be described in detail below with reference to the flow chart in FIG. 11B.

Referring to FIG. 11B, in step S1110, the control unit 205 verifies the settings included in the job received in step S1001 and determines whether the setting for determining the printing orientation has been set to the received job. In the present exemplary embodiment, the "setting for determining the printing orientation has been set to the received job" refers to a setting for executing gluing binding processing by the gluing bookbinding machine 200-3a and a setting for executing stapling and punching by the saddle stitch binding machine 200-3b which are described above. With respect to these settings, as described above, the setting processing is implemented using the setting of the printing orientation to execute desired finishing processing. Accordingly, if the printing orientation is changed due to other causes, the desired finishing processing cannot be implemented. This problem is the problem to be solved by the present invention, which is not solved by a conventional method.

If it is determined that the setting for determining the printing orientation has been set to the received job (YES in step S1110), then the processing advances to step S1111. In step S1111, the control unit 205 sets printing orientation fixed flag information to "TRUE" (or "ON") and stores the information on the RAM 208. In step S1112, the control unit 205 determines the printing orientation which is determined according to the setting set to the job.

If it is determined that the leading edge of the image to be printed is oriented to the apparatus front side (NO in step S1112), then the processing advances to step S1113. In step S1113, the control unit 205 determines that the printing orientation information is set to an "apparatus front side-oriented image leading edge orientation" and stores the printing orientation information on the RAM 208. On the other hand, if it is determined that the leading edge of the image to be printed is oriented to the apparatus rear side apparatus (YES in step S1114), then the processing advances to step S1114. In step S1114, the control unit 205 determines that the printing orientation information is set to an "apparatus rear side-oriented image leading edge orientation" and stores the printing orientation information on the RAM 208.

On the other hand, if it is determined that the setting for determining the printing orientation has not been set to the received job (NO in step S1110), then the processing advances to step S1115. In step S1115, the control unit 205 sets the printing orientation fixed flag information to "FALSE" (or "OFF") and stores the information on the RAM 208.

In step S1116, the control unit 205 refers to the information acquired in the preprint sheet orientation information acquisition processing in step S1003. Further, the control unit 205 determines the orientation of the preprint sheet set in the paper feed unit.

If it is determined that the preprint sheet has been set so that the leading edge of the content image printed on the preprint sheet is oriented towards the rear side of the apparatus (YES in step S1116), then the processing advances to step S1117. In step S1117, the control unit 205 stores the printing orientation information as the "apparatus rear side-oriented image leading edge orientation" on the RAM 208. On the other hand, if it is determined that the preprint sheet has been set so that the leading edge of the content image printed on the preprint sheet is oriented towards the front side of the apparatus (NO in step S1116), then the processing advances to step S1118. In step S1118, the control unit 205 stores the printing orientation information as the "apparatus front side-oriented image leading edge orientation" on the RAM 208.

With the above described configuration, the control unit 205 can execute print processing so that the orientation of the image to be printed and the orientation of the content that has been printed on the set preprint sheet becomes appropriate.

Returning to the flowchart in FIG. 10, in step S1005, the control unit 205 executes necessary image rotation processing according to the printing orientation information determined by the printing orientation determination processing in step S1004. The image rotation processing is executed as necessary. Accordingly, the image rotation processing is not executed according to the orientation of setting the sheet and the setting of the print job. In step S1006, the control unit 205 refers to the setting of the printing orientation fixation flag which has been set by the printing orientation determination processing and stored on the RAM 208 in step S1004, and determines whether the setting of the flag is "FALSE".

If it is determined that the setting of the flag is "FALSE" (YES in step S1006), then the processing advances to step S1009. In step S1009, the control unit 205 executes control for executing a normal output. On the other hand, if it is determined that the setting of the flag is not "FALSE" (NO in step S1006), then the processing advances to step S1007. In step S1007, the control unit 205 compares the printing orientation information set by the printing orientation determination processing in step S1004 with the preprint sheet orientation information acquired in step S1003. Then, the control unit 205 determines whether these pieces of the information match each other.

Figure 13:
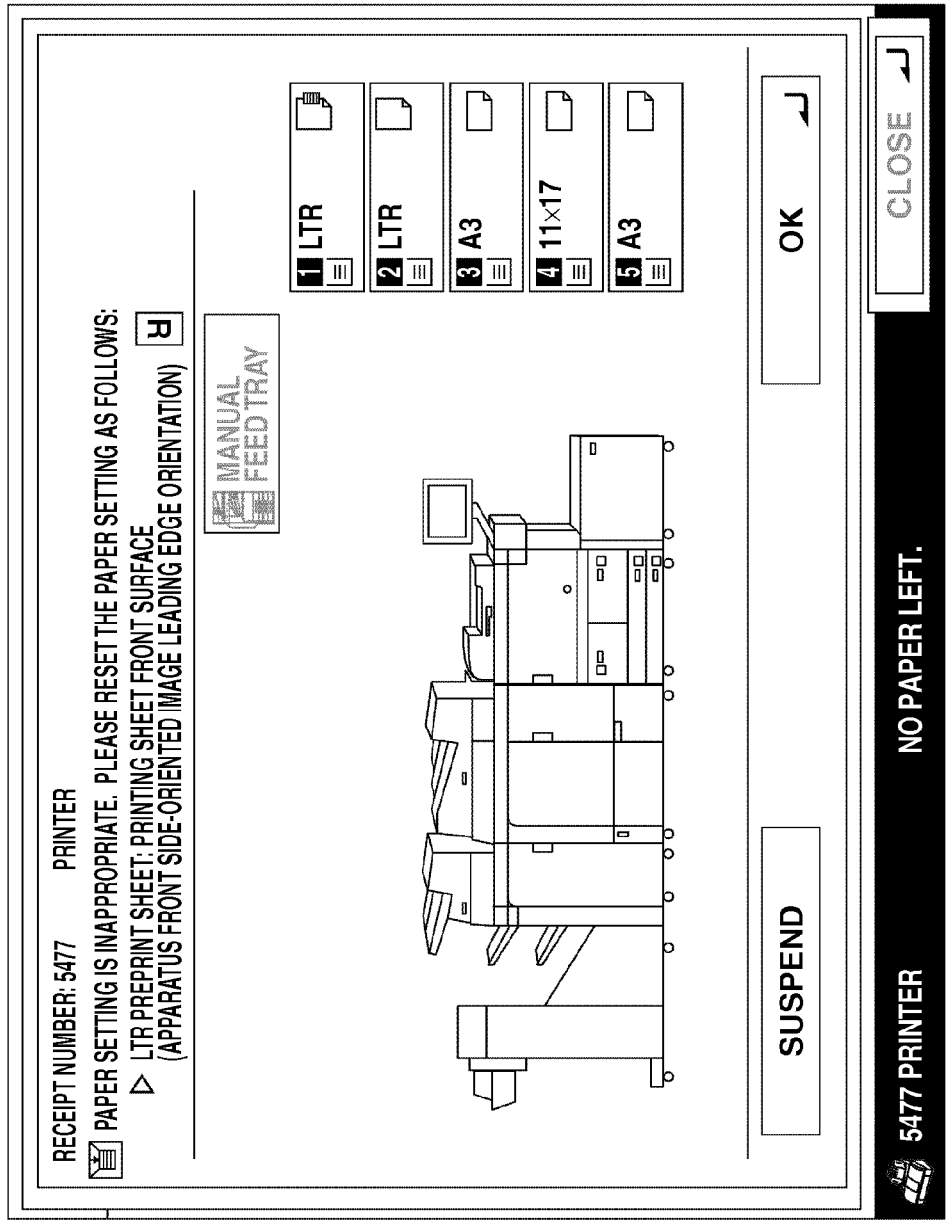
FIG. 13 illustrates an example of sheet orientation correction instruction screen.

If it is determined that the information match each other (YES in step S1007), then the processing advances to step S1009. In step S1009, the control unit 205 executes control for executing a normal output. On the other hand, if it is determined that the information does not much each other (NO in step S1007), then the processing advances to step S1008. In step S1008, the control unit 205 executes control for displaying a screen illustrated in FIG. 13 on the touch panel unit 401 of the operation unit 204.

In addition, in step S1008, the control unit 205 displays a message indicating an appropriate orientation of setting the preprint sheet to prompt the operator to set the preprint sheet in the appropriate orientation. Here, the "appropriate orientation of setting the preprint sheet" refers to an orientation in which the sheet can be appropriately subjected to the processing according to the setting included in the print job.

By executing the processing described above, the present exemplary embodiment can implement processing for instructing an operator to reset the preprint sheet in the appropriate orientation, only when it is necessary to reset the orientation of the preprint sheet. Accordingly, the present exemplary embodiment can prevent sheet orientation correction operations to a minimum. Further, if it is necessary to reset the orientation of the preprint sheet, the method for setting the preprint sheet in the appropriate orientation is displayed. Therefore, the operator does not need to think how to set the sheet, and the operation efficiency can be improved. Furthermore, a printing error due to wrong orientation setting can be prevented.

Figures 14, 14A, 14B:
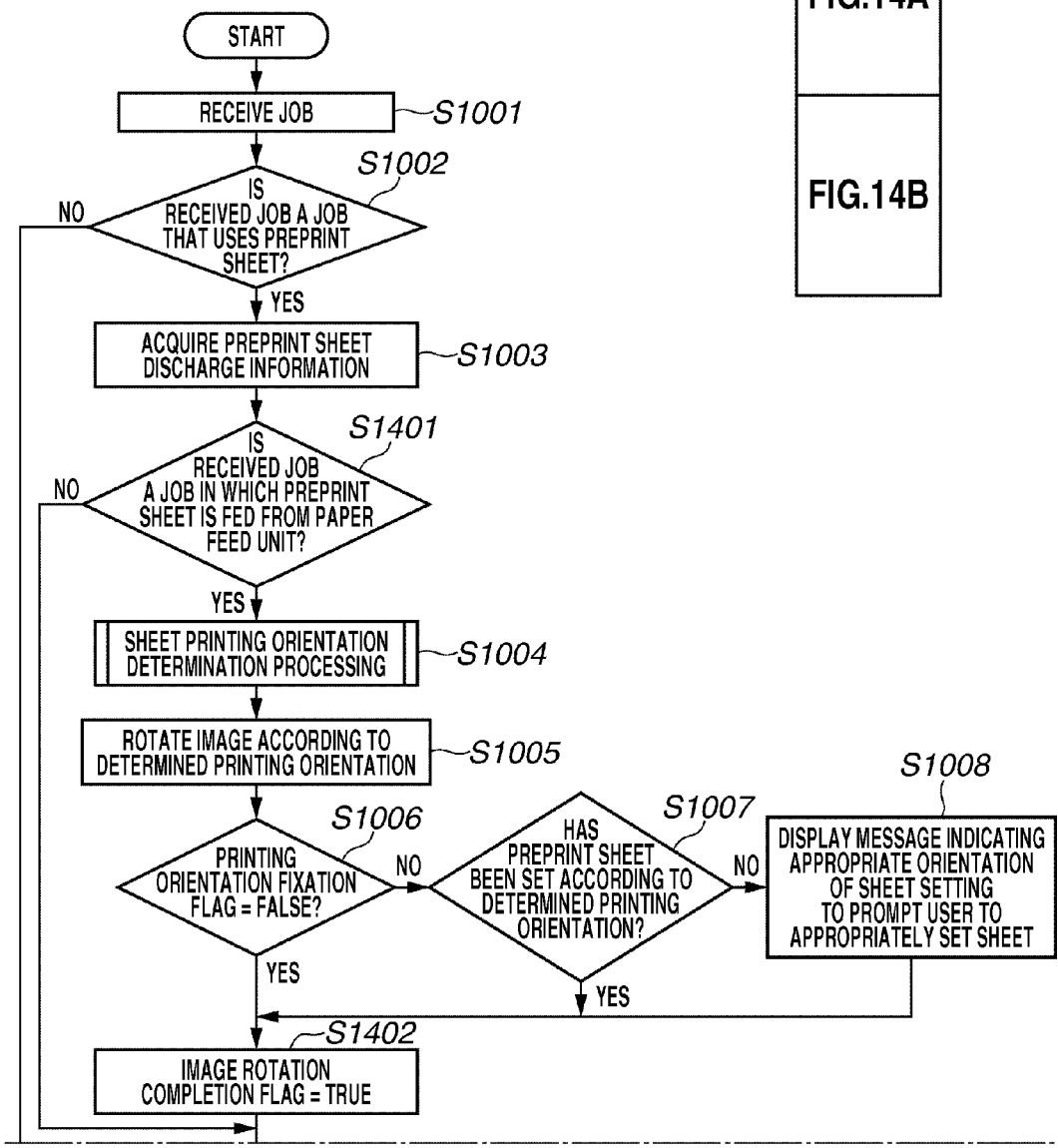
FIGS. 14A and 14B are expansion flow charts illustrating an example of processing executed by an inserter.
Figure 14B:
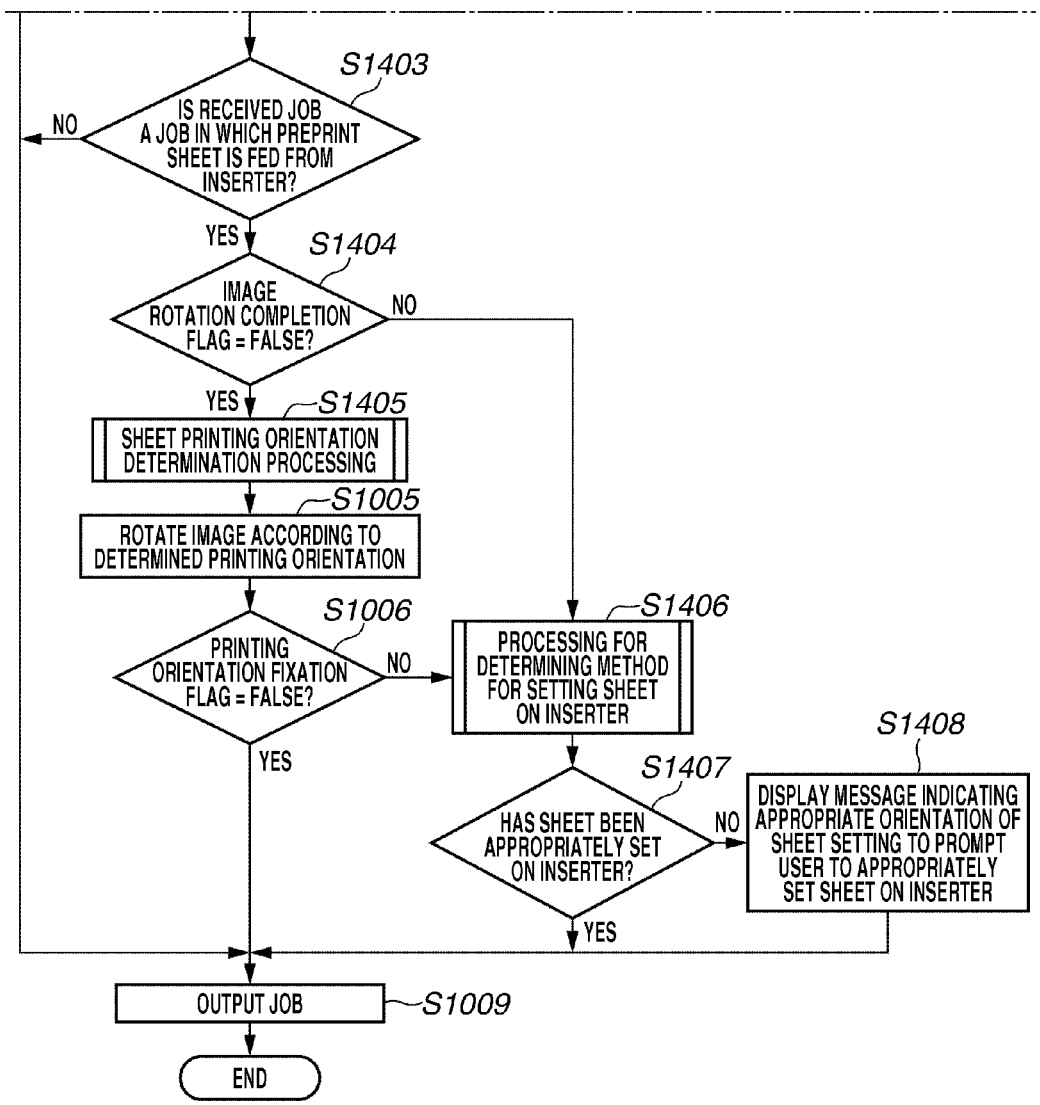

A second exemplary embodiment of the present invention will be described in detail below. FIG. 14 is a flow chart illustrating an example of processing according to the present exemplary embodiment. The processing is executed when a preprint sheet is set on the inserter 802, which is included in the saddle stitch binding machine 200-3b connected to the image forming apparatus 100 downstream thereof, to execute printing. Processing similar to the processing in the first exemplary embodiment described above with reference to FIG. 10 will not be repeatedly described here and points in difference from the first exemplary embodiment only will be described in detail below. More specifically, differences from the first exemplary embodiment are processing in steps S1401 through S1408. The processing in steps S1401 through S1408 is additionally provided in using the preprint sheet set on the inserter 802.

When the preprint sheet set on the inserter 802 is used, the control unit 205 executes processing in steps S1001 through S1003 to acquire the preprint sheet orientation information, by executing processing similar to that described above. In the present exemplary embodiment, the processing executed if it is determined that the received job does not use a preprint sheet in step S1002 will not be described in detail as in the first exemplary embodiment. Referring to FIG. 14, in step S1401, the control unit 205 determines whether the job to be processed is a job in which the preprint sheet is fed from the paper feed units 317 through 320.

If it is determined that the job to be processed is a job in which the preprint sheet is fed from the paper feed unit (YES in step S1401), then the processing similar to that as described above is executed in steps S1004 to S1008. Then in step S1402, because the printing orientation determination processing has been executed and the image rotation processing has been executed according to the determined printing orientation, the control unit 205 sets an image rotation completion flag to "TRUE" and stores the same on the RAM 208.

On the other hand, if it is determined that the received job is not a job in which the preprint sheet is fed from the paper feed unit (NO in step S1401), then the processing advances to step S1403. In step S1403, the control unit 205 determines whether the job to be processed is a job which uses the preprint sheet fed from the inserter.

If it is determined that the job to be processed is not a job in which the preprint sheet is not to be fed from the inserter (NO in step S1403), then the processing advances to step S1009. In step S1009, the control unit 205 executes control for executing a normal output. On the other hand, if it is determined that the job to be processed is a job in which the preprint sheet is fed from the inserter (YES in step S1403), then the processing advances to step S1404. In step S1404, the control unit 205 refers to the image rotation completion flag, which has been set in step S1402 and stored on the RAM 208, and determines whether the setting of the image rotation completion flag is "FALSE".

Although not illustrated in the drawing, the image rotation completion flag has been initialized to "FALSE" during initialization processing. If it is determined that the setting of the image rotation completion flag is "FALSE" (YES in step S1404), then the control unit 205 determines that the processing related to the printing orientation has not been executed, and the processing advances to step S1405 and beyond. In step S1405, the control unit 205 executes printing orientation determination processing. Then in step S1005, the control unit 205 executes necessary image rotation processing.

The processing executed in step S1405 is substantially similar to the printing orientation determination processing in step S1004. More specifically, the processing in step S1405 is different from the processing illustrated in FIG. 1004 described above with reference to FIG. 11B only in a point that the control unit 205 refers to the inserter for the information about the preprint sheet set in the paper feed unit in step S1116. Accordingly, the processing in step S1405 will not be described in detail.

On the other hand, if it is determined that the setting of the image rotation completion flag is not "FALSE" (NO in step S1404), then the processing advances to step S1406. In step S1406, the control unit 205 executes processing for determining the orientation of setting the preprint sheet onto the inserter.

Figure 15:
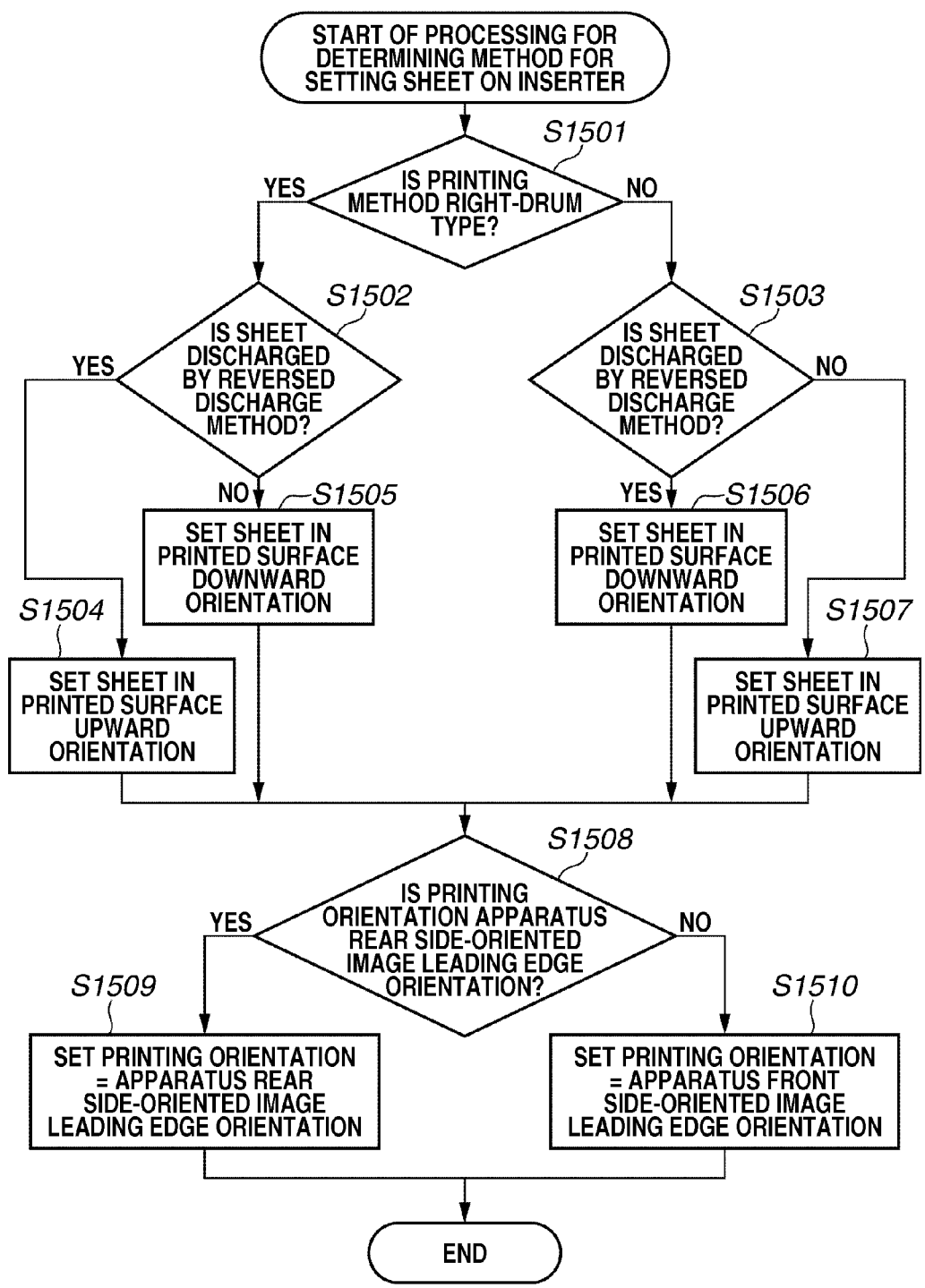
FIG. 15 is a flow chart illustrating an example of processing for determining an orientation of setting a sheet on the inserter.

FIG. 15 is a flow chart illustrating an example of processing for determining the setting of the preprint sheet on the inserter, which is executed in step S1406 illustrated in FIG. 14. The processing for determining the setting of the preprint sheet on the inserter, which is executed in step S1406 (FIG. 14), will be described in detail below with reference to FIG. 15.

Referring to FIG. 15, in step S1501, the control unit 205 determines which of the right-drum type printing mechanism that executes printing from the right side of the sheet material, and the left-drum type printing mechanism that executes printing from the left side of the sheet material is employed. Then in steps S1502 and S1503, the control unit 205 determines whether the printing mechanism is the reverse paper feed type printing mechanism.

Figure 16A:
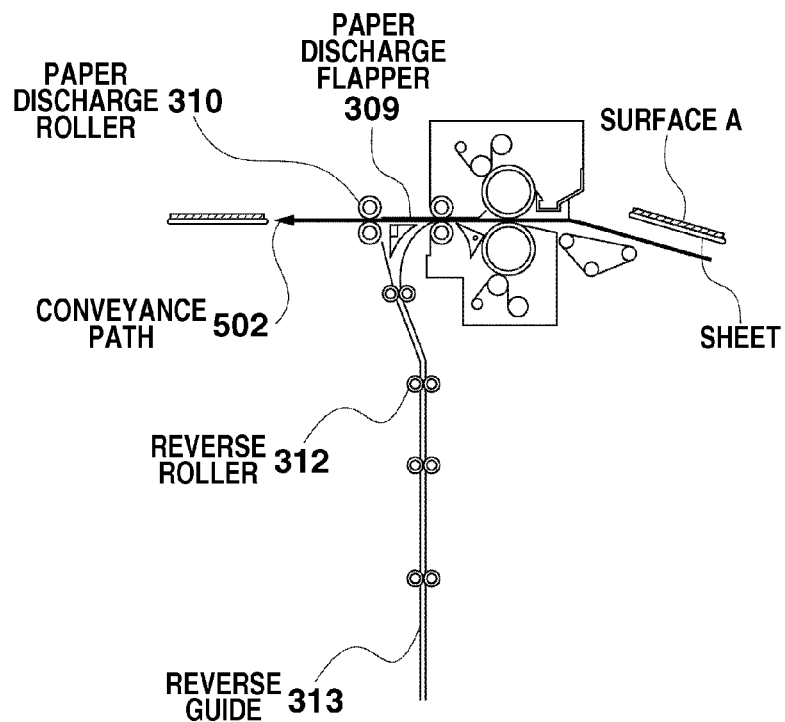
FIG. 16A illustrates an example of a paper discharge conveyance path when a reversal mechanism is not used.
Figure 16B:
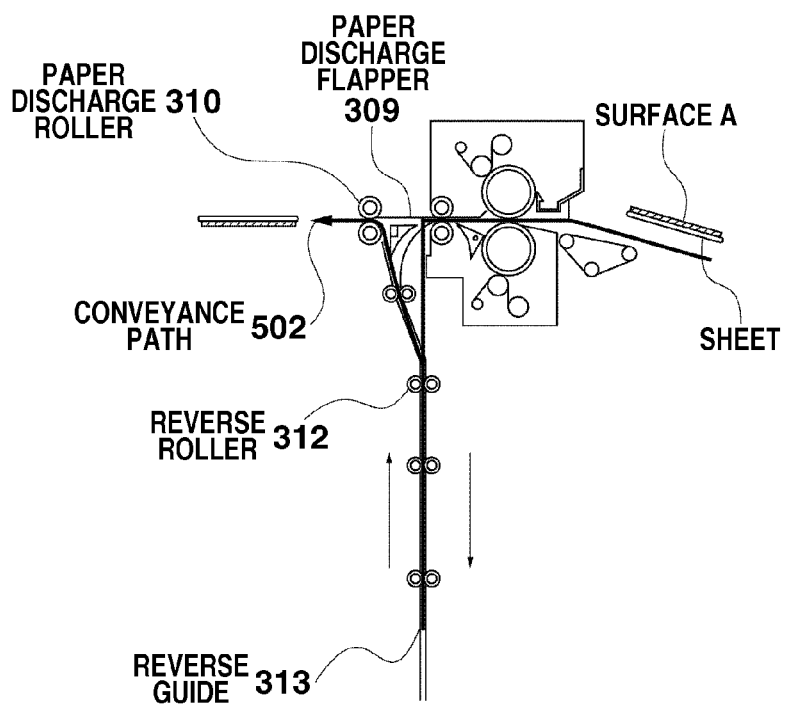
FIG. 16B illustrates an example of a paper discharge conveyance path when a reversal mechanism is used.

In order to supplement the description of the processing in steps S1501 through S1503, the paper discharge unit included in the image forming apparatus 100 will be described in detail below with reference to FIGS. 16A and 16B. Referring to FIGS. 16A and 16B, the paper discharge unit includes a paper discharge mechanism and a reverse mechanism. The paper discharge mechanism includes the paper discharge flapper 309 and the paper discharge roller 310. The reverse mechanism includes the reverse roller 312 and the reverse guide 313. The paper discharge flapper 309 can swing around the swinging axis and regulates the direction of conveying the sheet.

If the sheet is discharged without reversing, the paper discharge flapper 309 pivots clockwise in FIG. 16A. In this case, the sheet is conveyed straight and discharged outside the apparatus by the paper discharge roller 310 (FIG. 16A). On the other hand, if the sheet is discharged after being reversed, the paper discharge flapper 309 pivots counterclockwise in FIG. 16B. In this case, the sheet conveyance direction is changed downwards.

Then, the sheet is conveyed by the reverse roller 312 to the reverse guide 313. Then the reverse roller 312 temporally stops in a state in which the trailing edge of the sheet is pinched by the reverse roller 312. Further, the reverse roller 312 rotates in the reverse direction to convey the sheet by a switch back operation. Then, the sheet is discharged outside the apparatus by the paper discharge roller 310 in the state where the leading edge and the trailing edge of the sheet are changed in position. Thick line arrows 1601 and 1602 each denote the sheet material conveyance path.

Focusing on a surface A illustrated in FIG. 16B, the surface of the sheet is positionally changed if the sheet is reversed to be discharged. In the present exemplary embodiment, the saddle stitch binding machine 200-3b of the printing system 1000 which is connected to the image forming apparatus 100 downstream thereof includes the inserter 802. Accordingly, the orientation of setting the preprint sheet on the inserter 802 is determined according to whether the sheet printed by the image forming apparatus 100 is reversed to be discharged or is discharged straight through the paper discharge mechanism. Therefore, it is determined whether the paper discharge mechanism has the reverse paper discharge function in steps S1502 and S1503.

By executing the processing in steps S1501 through S1503, it is determined which surface the printing has been executed on the sheet that has been conveyed from the upstream apparatus to the saddle stitch binding machine 200-3b. More specifically, if the control unit 205 determines that the employed printing mechanism executes printing on the sheet material from the right side in step S1501 and determines that the paper discharge mechanism has the reverse paper discharge function in step S1502, then the control unit 205 further determines that the sheet having the image printed on the back surface thereof is conveyed. In this case, in step S1504, the control unit 205 stores information "printed surface=upward orientation" on the RAM 208 as the setting of the preprint sheet on the inserter 802.

On the other hand, if it is determined that the paper discharge mechanism does not have the reverse paper discharge function, then the control unit 205 determines that the sheet having the image printed on the front surface thereof is conveyed. In this case, in step S1505, the control unit 205 stores information "printed surface=downward orientation" (printed surface facing downward) on the RAM 208 as the setting of the preprint sheet on the inserter 802. Processing similar to that described above is executed in steps S1506 and S1507.

The above described determination result is acquired because the inserter 802 included in the saddle stitch binding machine 200-3b has a mechanism with which the set sheet is reversed in feeding. If an inserter having a mechanism with which the set sheet is fed straight therethrough, inverse values are stored by the control unit 205 on the RAM 208 in steps S1504 through S1507.

After executing the processing in step S1504 through S1507, then in step S1508, the control unit 205 acquires the printing orientation information that has been determined in step S1004 or S1405 and stored on the RAM 208 and determines whether the printing orientation information is "apparatus rear side-oriented image leading edge orientation". If it is determined that the "printing orientation=apparatus rear side-oriented image leading edge orientation" (YES in step S1508), then the processing advances to step S1509. In step S1509, the control unit 205 stores the information "content printing orientation=apparatus rear side-oriented image leading edge orientation" on the RAM 208. On the other hand, if it is determined that the "printing orientation=apparatus front side-oriented image leading edge orientation" (NO in step S1508), then the processing advances to step S1510. In step S1510, the control unit 205 stores the information "content printing orientation=apparatus front side-oriented image leading edge orientation" on the RAM 208.

Returning to the flow chart in FIG. 14, in step S1407, the control unit 205 compares the information about the orientation of setting the preprint sheet onto the inserter 802 which has been determined in step S1406, with the preprint sheet orientation information acquired in step S1003, and determines whether these pieces of the information match each other.

If it is determined that the information match each other (YES in step S1407), then the processing advances to step S1009. In step S1009, the control unit 205 executes control for executing a normal output. On the other hand, if it is determined that the information does not match each other (NO in step S1407), then the processing advances to step S1408. In step S1408, the control unit 205 displays a message indicating the appropriate orientation of setting the preprint sheet and prompts the operator to reset the preprint sheet in the appropriate orientation. The processing in step S1408 is similar to the processing described above with reference to FIG. 13. Accordingly, the description thereof will not be repeated here.

By executing the above described processing, the present exemplary embodiment having the configuration described above can be applied in a case where a preprint sheet is set onto the inserter 802. Accordingly, the present exemplary embodiment is useful in a case where the preprint sheet is set to an apparatus connected to the image forming apparatus 100 downstream thereof in addition to the case of setting the preprint sheet in the paper feed unit. Thus, the scope of applying the present invention can be broadened.

The present invention can be applied to a system or a merging apparatus including a plurality of devices (for example, a computer, an interface device, a reader, and a printer) and to an apparatus that includes one device. In addition, the present invention can also be achieved by providing the system or the device via a network or by using various storage media which store program code of software implementing the functions of the embodiments and by reading and executing the program code stored in the storage medium with a computer of the system or the device (a central processing unit (CPU) or a micro processing unit (MPU)). In this case, the program code itself, which is read from the storage medium, implements the functions of the exemplary embodiments mentioned above, and accordingly, the storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-203709 filed Sep. 3, 2009, which is hereby incorporated by reference herein in its entirety.

What is claimed is:

1. An image forming apparatus including a function of executing printing on a preprint sheet, the image forming apparatus comprising:
   a first determination unit configured to determine whether a printing mechanism in the image forming apparatus is a right-drum type printing mechanism for executing printing from a right side of a sheet or a left-drum type printing mechanism for executing printing from a left side of a sheet;
   a second determination unit configured to determine whether a paper feed unit selected by a user feeds a sheet by reversing the sheet; and
   a display control unit configured to display at least one of a first arrangement method indicating that a preprint sheet is placed in the paper feed unit in a state that a content already printed on the preprint sheet faces downward and a second arrangement method indicating that a preprint sheet is placed in the paper feed unit in a state that a content already printed on the preprint sheet faces upward,
   wherein, in a case where the printing mechanism is the right-drum type printing mechanism and the paper feed unit feeds a sheet by reversing the sheet, the display control unit displays a screen which allows a user to select the first arrangement method and not to select the second arrangement method,
   wherein, in a case where the printing mechanism is the right-drum type printing mechanism and the paper feed unit feeds a sheet without reversing the sheet, the display control unit displays a screen which allows a user to select the second arrangement method and not to select the first arrangement method,
   wherein, in a case where the printing mechanism is the left-drum type printing mechanism and the paper feed unit feeds a sheet by reversing the sheet, the display control unit displays a screen which allows a user to select the second arrangement method and not to select the first arrangement method, and
   wherein, in a case where the printing mechanism is the left-drum type printing mechanism and the paper feed unit feeds a sheet without reversing the sheet, the display control unit displays a screen which allows a user to select the first arrangement method and not to select the second arrangement method.

2. The image forming apparatus according to claim 1, further comprising:
   a reception unit configured to receive from a user a designation of a printing orientation of the content already printed on the preprint sheet in addition to designations of the first arrangement method and the second arrangement method;

a receiving unit configured to receive a print job;

a third determination unit configured to determine whether a printing orientation determined based on the print job coincides with the received printing orientation of the content already printed on the preprint sheet; and an instruction unit configured to issue an instruction to reset the preprint sheet in a case where it is determined that the printing orientation determined based on the print job does not coincide with the received printing orientation of the content already printed on the preprint sheet.

3. An image forming method for printing on a preprint sheet, comprising:

determining whether a printing mechanism is a right-drum type printing mechanism for executing printing from a right side of a sheet or a left-drum type printing mechanism for executing printing from a left side of a sheet;

determining whether a paper feed unit selected by a user feeds a sheet by reversing the sheet; and displaying at least one of a first arrangement method indicating that a preprint sheet is placed in the paper feed unit in a state that a content already printed on the preprint sheet faces downward and a second arrangement method indicating that a preprint sheet is placed in the paper feed unit in a state that a content already printed on the preprint sheet faces upward, wherein, in a case where the printing mechanism is the right-drum type printing mechanism and the paper feed unit feeds a sheet by reversing the sheet, a screen is displayed which allows a user to select the first arrangement method and not to select the second arrangement method, wherein, in a case where the printing mechanism is the right-drum type printing mechanism and the paper feed unit feeds a sheet without reversing the sheet, a screen is displayed which allows a user to select the second arrangement method and not to select the first arrangement method, wherein, in a case where the printing mechanism is the left-drum type printing mechanism and the paper feed unit feeds a sheet by reversing the sheet, a screen is displayed which allows a user to select the second arrangement method and not to select the first arrangement method, and wherein, in a case where the printing mechanism is the left-drum type printing mechanism and the paper feed unit feeds a sheet without reversing the sheet, a screen is displayed which allows a user to select the first arrangement method and not to select the second arrangement method.

4. The image forming method according to claim 3, further comprising:

receiving from a user a designation of a printing orientation of the content already printed on the preprint sheet in addition to designations of the first arrangement method and the second arrangement method;

receiving a print job;

determining whether a printing orientation determined based on the print job coincides with the received printing orientation of the content already printed on the preprint sheet; and resetting the preprint sheet in a case where it is determined that the printing orientation determined based on the print job does not coincide with the received printing orientation of the content already printed on the preprint sheet.

5. A non-transitory computer-readable medium storing a computer-executable process, the computer-executable process causing a computer to execute an image forming method for printing on a preprint sheet, comprising:

determining whether a printing mechanism is a right-drum type printing mechanism for executing printing from a right side of a sheet or a left-drum type printing mechanism for executing printing from a left side of a sheet;

determining whether a paper feed unit selected by a user feeds a sheet by reversing the sheet; and displaying at least one of a first arrangement method indicating that a preprint sheet is placed in the paper feed unit in a state that a content already printed on the preprint sheet faces downward and a second arrangement method indicating that a preprint sheet is placed in the paper feed unit in a state that a content already printed on the preprint sheet faces upward, wherein, in a case where the printing mechanism is the right-drum type printing mechanism and the paper feed unit feeds a sheet by reversing the sheet, a screen is displayed which allows a user to select the first arrangement method and not to select the second arrangement method, wherein, in a case where the printing mechanism is the right-drum type printing mechanism and the paper feed unit feeds a sheet without reversing the sheet, a screen is displayed which allows a user to select the second arrangement method and not to select the first arrangement method, wherein, in a case where the printing mechanism is the left-drum type printing mechanism and the paper feed unit feeds a sheet by reversing the sheet, a screen is displayed which allows a user to select the second arrangement method and not to select the first arrangement method, and wherein, in a case where the printing mechanism is the left-drum type printing mechanism and the paper feed unit feeds a sheet without reversing the sheet, a screen is displayed which allows a user to select the first arrangement method and not to select the second arrangement method.

6. The computer-readable medium according to claim 5, further comprising:

receiving from a user a designation of a printing orientation of the content already printed on the preprint sheet in addition to designations of the first arrangement method and the second arrangement method;

receiving a print job; and determining whether a printing orientation determined based on the print job coincides with the received printing orientation of the content already printed on the preprint sheet; and resetting the preprint sheet in a case where it is determined that the printing orientation determined based on the print job does not coincide with the received printing orientation of the content already printed on the preprint sheet.

* * * * *